United States Patent
Boyd et al.

(10) Patent No.: US 9,258,244 B1
(45) Date of Patent: Feb. 9, 2016

(54) PROTOCOL FOR COMMUNICATIONS IN POTENTIALLY NOISY ENVIRONMENTS

(71) Applicant: Sandia Corporation, Albuquerque, NM (US)

(72) Inventors: Gerald M. Boyd, Albuquerque, NM (US); Jeffrey Farrow, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 64 days.

(21) Appl. No.: 14/254,991

(22) Filed: Apr. 17, 2014

Related U.S. Application Data

(60) Provisional application No. 61/818,354, filed on May 1, 2013.

(51) Int. Cl.
*H04L 12/413* (2006.01)
*H04L 12/825* (2013.01)
*H04L 1/00* (2006.01)
*H04L 12/26* (2006.01)

(52) U.S. Cl.
CPC .............. *H04L 47/25* (2013.01); *H04L 1/0061* (2013.01); *H04L 43/10* (2013.01); *H04L 2001/0094* (2013.01); *H04L 2001/0097* (2013.01)

(58) Field of Classification Search
CPC ..... H04L 12/28; H04L 12/413; H04L 49/254; H04L 24/29
See application file for complete search history.

(56) References Cited

U.S. PATENT DOCUMENTS

| | | | |
|---|---|---|---|
| 5,758,169 A | 5/1998 | Nizar et al. | |
| 5,999,541 A * | 12/1999 | Hinchey et al. | 370/466 |
| 6,434,638 B1 | 8/2002 | Deshpande | |
| 7,570,600 B1 | 8/2009 | Slaughter et al. | |
| 8,107,492 B2 | 1/2012 | Hofmann et al. | |
| 8,275,864 B1 | 9/2012 | Slaughter et al. | |
| 8,442,948 B2 | 5/2013 | Middlecamp et al. | |
| 2005/0083879 A1* | 4/2005 | Peek | 370/329 |
| 2007/0179733 A1* | 8/2007 | Clark et al. | 702/122 |
| 2007/0230667 A1* | 10/2007 | Warner et al. | 379/27.01 |
| 2008/0285457 A1* | 11/2008 | Larson et al. | 370/237 |
| 2009/0154465 A1* | 6/2009 | Diab et al. | 370/395.1 |
| 2009/0201847 A1* | 8/2009 | Yabo et al. | 370/317 |
| 2010/0174955 A1* | 7/2010 | Carnevale et al. | 714/718 |
| 2011/0208892 A1* | 8/2011 | Meyers | 710/313 |
| 2012/0047308 A1* | 2/2012 | Feng | 710/311 |
| 2014/0025846 A1* | 1/2014 | Miyauchi | 710/11 |
| 2014/0095930 A1 | 4/2014 | Xun et al. | |
| 2015/0124600 A1* | 5/2015 | Nobauer et al. | 370/230 |

\* cited by examiner

*Primary Examiner* — Andrew Lee
(74) *Attorney, Agent, or Firm* — Medley, Behrens & Lewis, LLC

(57) ABSTRACT

A communications protocol that is designed for transmission of data in networks that are subjected to harsh conditions is described herein. A network includes a plurality of devices, where the devices comprise respective nodes. The nodes are in communication with one another by way of a central network hub. The protocol causes the nodes to transmit data over a network bus at different data rates depending upon whether the nodes are operating normally or an arbitration procedure has been invoked.

19 Claims, 23 Drawing Sheets

SPI MODE – READ RX BUFFER COMMAND

PROTOCOL FOR COMMUNICATIONS IN POTENTIALLY NOISY ENVIRONMENTS

RELATED APPLICATION

This application claims priority to U.S. Provisional Patent Application No. 61/818,354, filed on May 1, 2013, and entitled "Foundation Communications Bus", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Devices in networked systems (e.g., a network) transmit communications between one another to accomplish tasks. Some networks can be subjected to harsh environments, such as those that include noise, radiation, and other environmental factors. Even in a harsh environment, devices in these networks must be able to communicate with one another. While conventional communications protocols, such as Ethernet, are well-suited for most networks, these conventional protocols lack sufficient features for the networks referenced above.

SUMMARY

The following is a brief summary of subject matter that is described in greater detail herein. This summary is not intended to be limiting as to the scope of the claims.

A communications protocol for managing the transmission of data packets across a network is shown and described. Further, a method of managing data transmission within a network using the above-referenced protocol is shown and described. Still further, a method for testing operation of a network utilizing the above-referenced communications protocol is shown and described.

An exemplary network includes a plurality of devices that are in network communication with one another, the devices configured to transmit and receive data over the network in accordance with the protocol referenced above. The devices include respective applications, which are configured to generate and consume data. The devices further include respective nodes, wherein each node is configured to communicate over the network in accordance with the protocol. The devices further include interfaces that respectively interface nodes with applications.

For instance, as referenced above, a device communicating over the network includes a node, an interface, and an application. When the device is receiving data, the node receives a data packet that conforms to the protocol. The interface receives the data packet from the node, and generates output data based upon the data packet, wherein the output data is configured for consumption by the application. The application receives the output data and optionally can generate new data based upon the output data. When the device is transmitting data, the application outputs data, and the interface formats the data in a suitable format for the node. The node then transmits a data packet over the network in conformance with the protocol.

The protocol has various features that are well-suited for network implementation in harsh environments. For example, the protocol supports isolation of an application from low-level network management. Additionally, firewalls can be provided by way of the protocol, such that safety-critical traffic is distributed over the network only to applications that are authorized to receive such traffic. Still further, the protocol facilitates prevention of lockups, wherein state machines in the network can be forced to a known state when transactions of interfaces are ended or bus activity aborts.

In yet another exemplary embodiment, the protocol facilitates determining whether an application that is to receive a message is busy, and whether the application accepts the message—thus reducing the burden on the application that is to receive the data. The protocol further facilitates the bus operating without need of a master bus controller, thereby reducing management overhead and increasing reliability for critical functions. In addition, the protocol prevents lost packets due to "collisions", which can occur in conventional protocols.

Still further, headers of data packets and payloads of data packets, when configured in accordance with the protocol, include application data that facilitates prevention of corrupted data from being transmitted over the network. Thus, for example, an application can reject a data packet that has been corrupted by noise in a harsh environment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Figure 1:
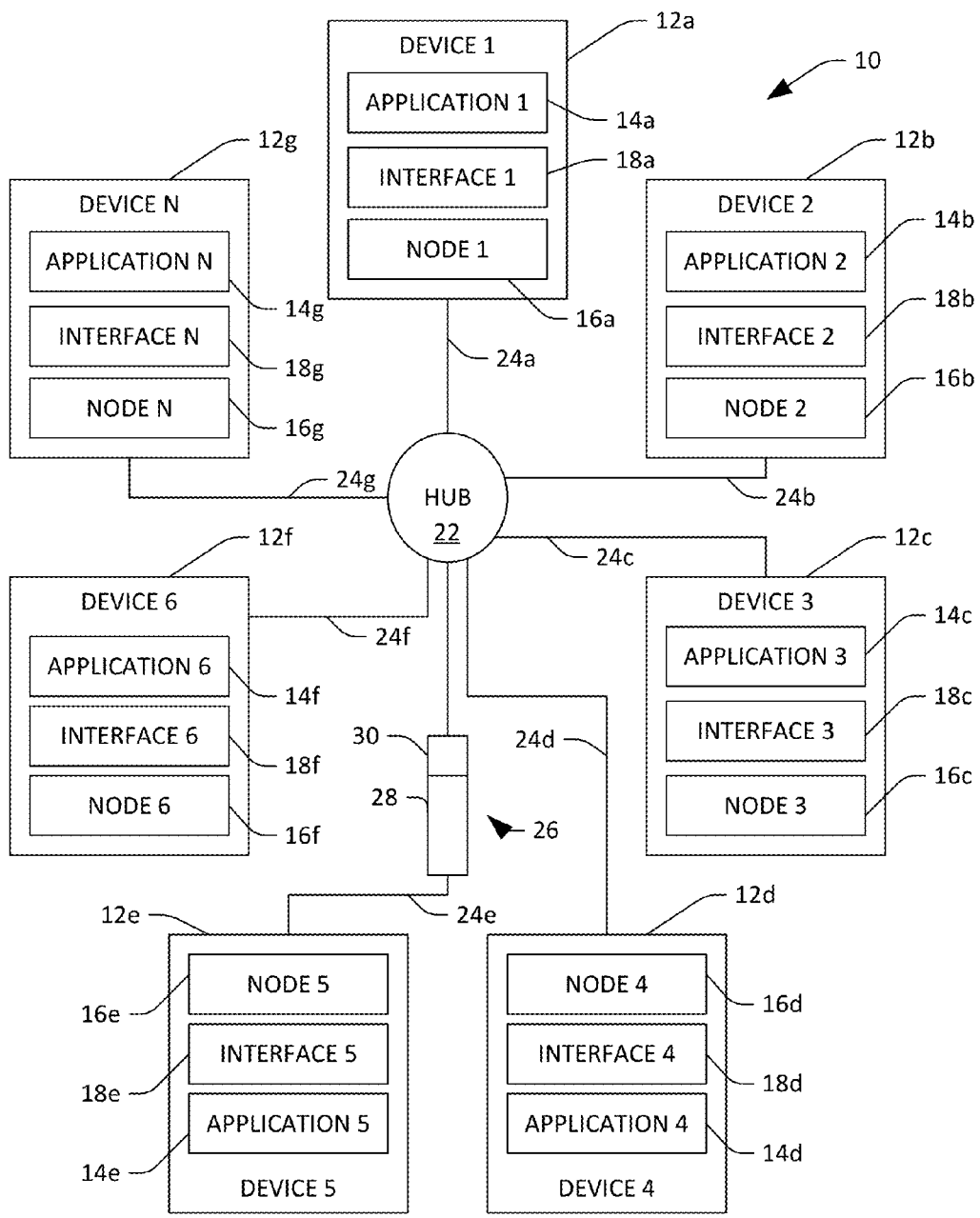
FIG. 1 depicts an exemplary communications system.

An Appendix attached hereto describes exemplary implementations of aspects of the invention.

DETAILED DESCRIPTION

Various technologies pertaining to a communications protocol that facilitates secure, reliable communications in a harsh environment are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary network system 10 is illustrated, wherein devices in the system 10 communicate with one another by way of a protocol, referred to herein as the "foundation" protocol. The system 10 includes a plurality of devices 12a-12g (collectively referred to as devices 12), which execute respective applications 14a-14g (collectively referred to as applications 14). The devices 12 can be or include any suitable devices, including computing devices, network infrastructure devices, application-specific integrated circuits (ASICs), field programmable gate arrays (FPGAs), etc. The applications 14 are configured to consume and produce data in accordance with their respective configurations. For example, an application in the applications 14 can be programmed in software to consume and produce the data, or can be configured in hardware to produce and consume the data, etc.

The devices 12 further comprise respective nodes 16a-16g (referred to collectively as nodes 16), wherein the nodes 16 are configured to facilitate receipt and transmittal of data over a bus in accordance with the foundation protocol. A node can be an ASIC, an FPGA, a processor, a portion thereof, etc. that is configured to communicate over a bus by way of the foundation protocol. The devices 12 also include interfaces 18a-18g (collectively referred to as interfaces 18) that respectively interface the applications 14 with the nodes 16. In an example, the interface 18a can inform the application 14a as to whether data generated by the application for transmittal was successfully transmitted, whether errors were generated, type of errors, etc. For example, the interface 18a can receive data from its application 14a for transmittal, and confirm to the application 14a that the data was successfully transmitted.

The network system 10 further includes a hub 22 through which all communications between the devices 12 pass. Communications channels 24a-g communicatively couple the devices 12a-g in the network system (e.g., by way of the hub 22). The communications channels 24a-g can be any suitable communications channels, including wireless, wired, parallel, or serial. Additionally, test or monitoring equipment (not shown) can be coupled to the hub 22 to monitor data being sent over the network system 10.

Based upon instructions from the applications 14, the nodes 16 transmit packets 26 that include payloads 28 (referred to as data) and headers 30 over the bus (e.g., formed from the hardware and associated software that facilitates communications between the devices 12). In an exemplary embodiment, each of the nodes 16 can only listen for its own address. In comparison, testing or monitoring equipment coupled to the hub 22 can listen for all communications within the system 10. Thus, the system 10 provides improved testing of communications within the system 10 relative to conventional systems that communicate using conventional protocols. Moreover, as will be described herein, the foundation protocol facilitates management of speed of transmissions of data within the system 10, manages firewalls (e.g., without requiring a master bus controller), etc. This reduces management overhead and increases reliability for system-critical functions. The foundation protocol further permits global messaging to all addresses within the system 10, as well as blind broadcast features that increase bandwidth without safety concerns that can be used for diagnostics.

The protocol also permits testing of the data 28 in the system 10 to determine whether any corruption has occurred due to noise, radiation, or other external factors that are present within the system 10. The system 10 can further provide feedback for every application-requested operation that occurs within the system 10. The system 10, for instance, utilizes a plug and play bus kernel that provides a common backbone for future equipment design, and can interface with both legacy systems and newly designed host platforms.

Additional detail pertaining to the protocol is now set forth. The protocol defines an addressing scheme that provides full traceability for testing functions within the system 10. As communications are transferred across the system 10, a source device address, a destination device address, a function (e.g., application or object used by the application) within the destination device that the data 28 belongs to, the type of data (in the case of instrumentation), a time the data 28 was requested to be sent by the application that transmits the data, and a time the data 28 was actually transmitted by a node are all completely visible for diagnostic purposes.

The nodes 16, when programmed to transmit and receive data by way of the foundation protocol, can further include logic that causes them to act as protocol controllers. When acting as a protocol controller, for example, the node 16a provides special features that isolate the application 14a from low level network management. When requested by the application 14a, the node 16a automatically manages bus transactions and will notify the application 14a when the bus transactions are complete. The state of transactions may be monitored using a status code. The nodes 16 can further provide firewalls to allow safety-critical traffic to only be distributed to authorized applications.

Further, when acting as a protocol controller, the node 16a, for instance, can prevent lockups of the communications system 10. State machines of the node 16a can be forced to a known state when transactions performed by the interface 18a are ended or bus activity aborts. The foundation protocol has features that automatically allow the node 16a to determine if a recipient application (e.g., the application 14b) at the other end is busy and if the other end accepts the message. The burden on the applications 14 is reduced by design in the foundation protocol.

The protocol is particularly well-suited for fast transmission of time critical control messages, and bandwidth for instrumentation functions can be optimized. The protocol can further support an arbitration scheme, which prevents lost packets due to "collisions" that can sometimes occur in conventional protocols. As indicated previously, packets 26 include both the header 30, which comprises address information, and payload 28, which comprises data generated by an application. The protocol includes built-in protection for both the header 30 and the payload 28 in order to prevent corrupted data from being used within the system 10. This prevents packets 26 from being accepted that have been corrupted by different types of noise in harsh environments. Data 28 is only received at an intended recipient application (e.g., application 14b) if the data passes error detection checks built into the protocol. A sending node (which, in examples herein, refers to the node 16a) automatically determines the state of each transmission request. The header 30 and payload 28 structure of the packets 26 is optimized to allow for event based functions to occur.

The foundation protocol, when implemented in a networked system such as the system 10, increases the reliability of the system 10, as fewer cabling for interconnections is required compared to conventional network systems configured for operation in harsh environments (e.g., which include point-to-point connections). Moreover, the protocol facilitates re-configurability to achieve new capabilities, resulting in lower system cost (relative to conventional network systems deployed in harsh environments). Plug-and-play capability is provided because the communications hub 22 includes ports that can be utilized by the designer to investigate occurrences within the system. The system 10 is designed so that it will not lock up and will always self-recover.

As indicated previously, the nodes 16 are in communication with respective applications 14 by way of respective interfaces 18. Each of the nodes 16 can be broken into two separate sections: one where the nodes act as transmitters, one when the nodes 16 act as receivers. A top-level structure of an exemplary node is illustrated in Error! Reference source not found.3. A block diagram of the top-level signals of the node 14 and each signal interface is shown in Error! Reference source not found.4.

Nodes 16 can be implemented as respective chips (e.g., ASICS or FPGAs), and can send and receive data by way of pins on respective communications boards upon which the chips reside. The pins can respectively correspond to other nodes in the network system 10. Thus, for a particular node (e.g., node 16a), the pins can be set to define other nodes with which the particular node 16a can communicate. For instance, the node 16a can be in a chip that comprises at least 6 pins: one for each of the other nodes 16b-16g in the system 10. Whether or not the pin is tied to ground can define whether the node can communicate with another node that corresponds to the pin. Thus, a designer of the system 10 can define the communication paths, such that communications can be restricted based upon the pin definitions. Information concerning exemplary pin definitions is depicted in Table 1 below.

TABLE 1

FOUNDATION NODE TOP LEVEL PIN DEFINITIONS

| I/O Name | I/O Direction | Reset Value |
| --- | --- | --- |
| Clock_50 | In | |
| Reset | In | |
| Power_Detect_n | In | |
| User_Active | In | |
| User_Strobe | In | |
| Command_Complete | Out | '0' |
| User_In [7:0] | In | |
| User_Out [7:0] | Out | 0X00 |
| Module_Address [7:0] | In | |
| RX_Buffer_Ready | Out | '0' |
| U_TX_Error_Code [2:0] | Out | "000" |
| SPI_En | In | |
| PL_All_Address | In | |
| PL_En | In | |
| PL_Node_Address (Array) | In | |
| PL_Valid | Out | '0' |
| PL_Data [7:0] | Out | 0X00 |
| ScanMode | In | |
| ScanTestEn_RX | In | |
| ScanTestEn_TX | In | |
| ScanTestIn_RX | In | |
| ScanTestIn_TX | In | |
| ScanTestOut_RX | Out | |
| ScanTestOut_TX | Out | |
| BistMode | In | |
| User_OE [7:0] | Out | 0X00 |
| FB_Timestamp [31:0] | Out | 0X00000000 |
| FB_Version [7:0] | Out | |
| Int_Clock_Mon | Out | '0' |
| Firewall_1_Enable_Pin_1_n | In | |
| Firewall_1_Enable_Pin_2_n | In | |
| Firewall_2_Enable_Pin_1_n | In | |
| Firewall_2_Enable_Pin_2_n | In | |
| LVDS_En | In | |
| RX_LVDS_En | Out | LVDS_En |
| TX_LVDS_En | Out | LVDS_En |
| CMOS_TX_Bus_Drive | Out | '1' |
| CMOS_RX_Bus_In | In | |
| TX_Bus_Drive | Out | '1' |
| RX_Bus_In | In | |
| Serial_Time_Clock | Out | '0' |
| Serial_Time_Data | Out | '0' |
| Serial_Time_Sync | Out | '0' |
| Report_CRC_Error | Out | '0' |
| Report_Module_Not_Addressed | Out | '0' |
| Report_NS_Safety_B lock | Out | '0' |
| Report_Packet_Accepted | Out | '0' |
| Report_RX_Data | Out | '0' |
| Report_RX_Data_Valid | Out | '0' |
| Report_RX_Packet_Active | Out | '0' |
| Report_Abort_RX_Active | Out | '0' |
| Report_App_Busy_Error | Out | '0' |
| Report_Illegal_Module_Address_Error | Out | '0' |
| Report_Stuff_Error | Out | '0' |
| CMOS_TX_Bus_Drive_Out_En | Out | Not(power_detect) |

TABLE 1-continued

FOUNDATION NODE TOP LEVEL PIN DEFINITIONS

| I/O Name | I/O Direction | Reset Value |
| --- | --- | --- |
| Command_Complete_Out_En | Out | Not(power_detect) |
| RX_Buffer_Ready_Out_En | Out | Not(power_detect) |
| Serial_Time_Clock_Out_En | Out | Not(power_detect) |
| Serial_Time_Data_Out_En | Out | Not(power_detect) |
| Serial_Time_Sync_Out_En | Out | Not(power_detect) |
| TX_Bus_Drive_Out_En | Out | Not(power_detect) |
| PL_Data_En | Out | Not(power_detect) |
| PL_Valid_En | Out | Not(power_detect) |
| U_TX_Error_Code_Out_En | Out | Not(power_detect) |

In an exemplary embodiment, the nodes 16 can be hardware designed in VHDL. As indicated previously, a node can include definitions for the foundation protocol, receive and transmit memories, and error checking logic.

As shown in FIG. 1, the nodes 16 transmit packets 26 that include data 28 over the bus. Each of the nodes 16 can send packets 26 only when they have control of the bus, preventing multiple packets from being sent by multiple nodes over the bus at one time. Pursuant to an example, the node 16a can gain control of the bus, and can transmit packets 26 for receipt by other nodes in the network system 10. When packets 26 are sent by the node 16a, the packets 26 pass through the hub 22 and reaches at least one recipient node (e.g., the node 16b). The recipient node 16b performs a cyclic redundancy check (CRC) over contents of the payload 28 to generate a CRC value, and determines whether to accept or reject the packet 26 based upon the CRC. Specifically, the transmitter node 16a can generate a first CRC value for the payload 28, and can include the first CRC value in the data packet 26. The recipient node 16b computes a second CRC value based upon content of the payload 28, and compares the second CRC value with the first CRC value to ensure that contents of the payload 28 have not altered during transmission (e.g., due to harsh environment conditions).

When the recipient node 16b detects errors, it disregards the packet 26, and can optionally transmit an indication to the transmitting node 16a that the packet 26 was rejected. The transmitting node 16a is informed that the packet 26 was not accepted (e.g., by the destination node 16b), and the transmitting node 16a can retransmit the data packet 26 if desired. When processing the packet 26, if the recipient node 16 detects an error, the recipient node 26 can return to a previous state (e.g., reset if desired).

The nodes 16 can also be configured, in accordance with the foundation protocol, to timestamp data packets 26, thereby allowing for continuous, end-to-end monitoring of traffic through the system 10.

The protocol also supports an arbitration scheme that can be used to ascertain which of the nodes 16 has control of the bus for transmittal of data. The arbitration scheme prevents collisions, and is described in greater detail herein.

Figure 2:
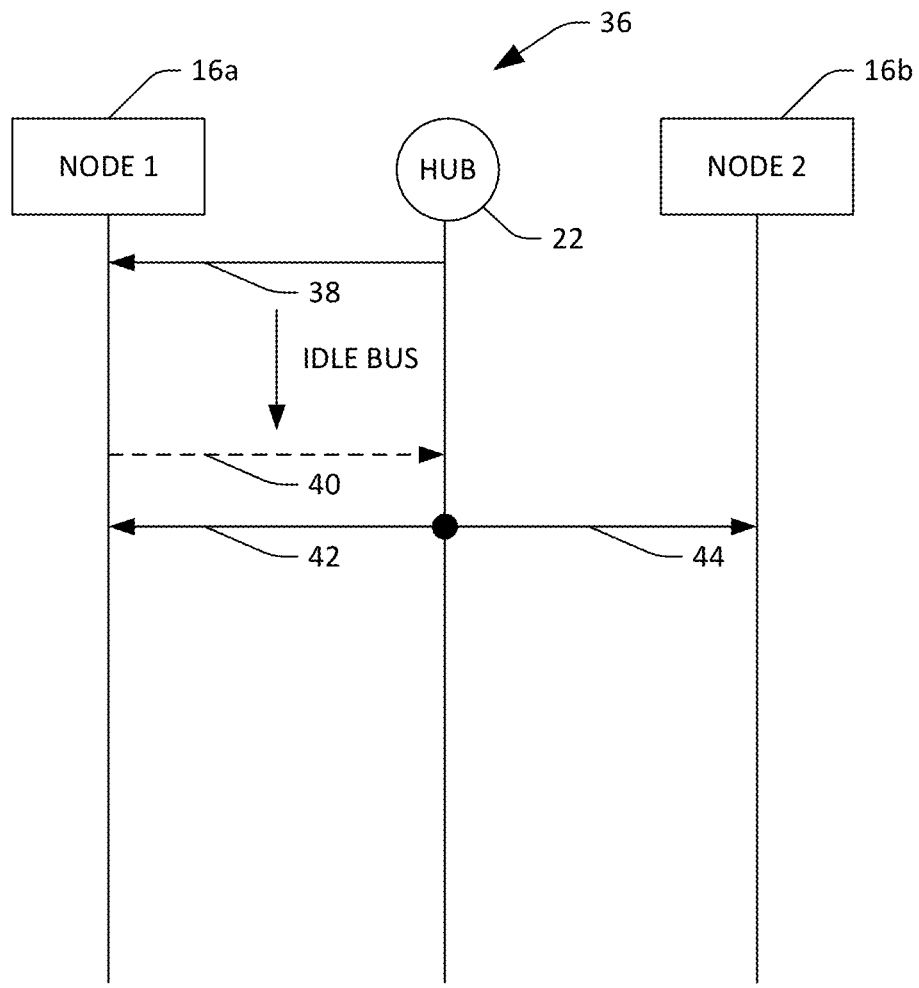
FIG. 2 depicts an exemplary of communications within the communications system and an arbitration system used for governing communications.
Figure 3:
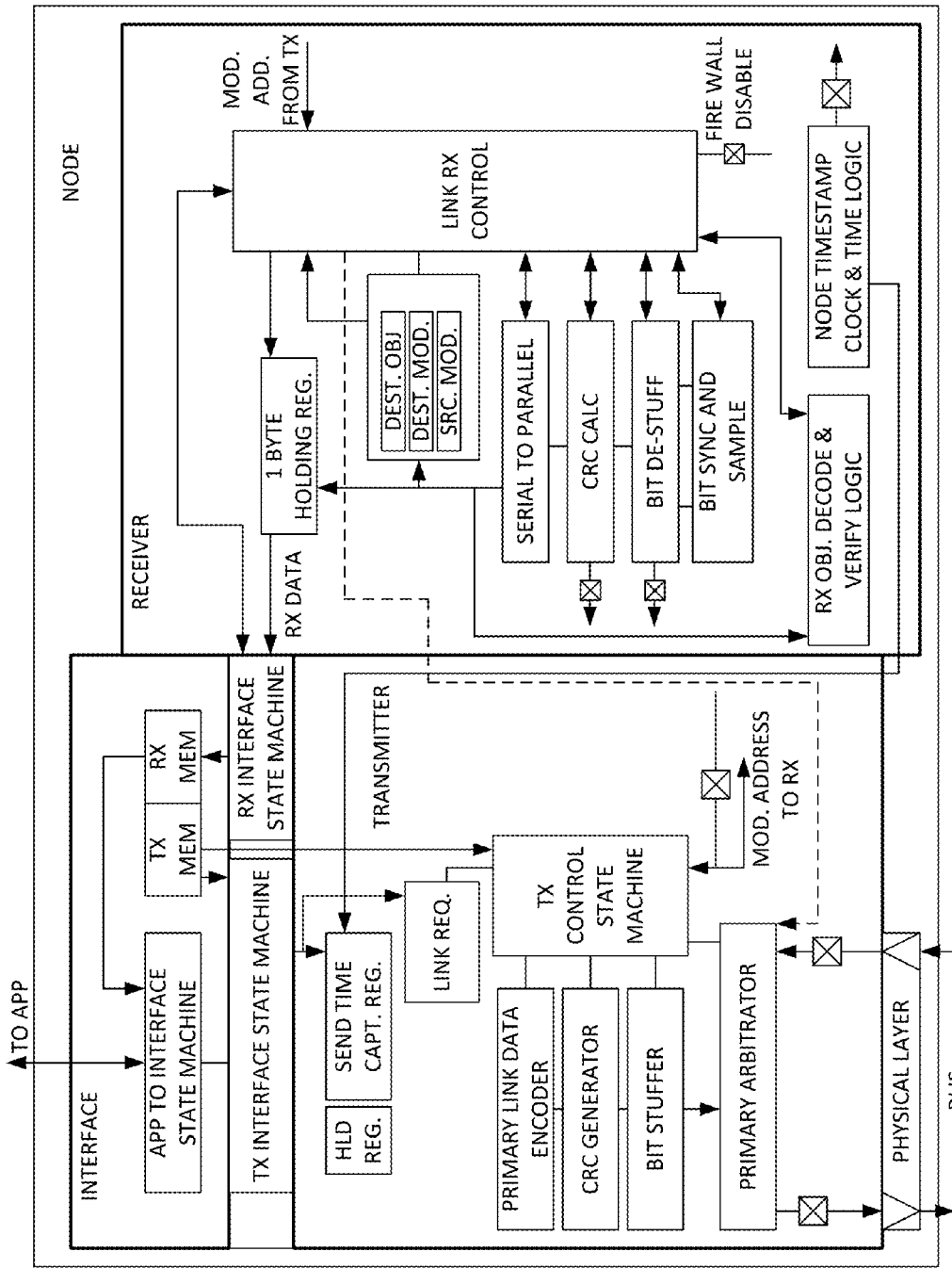
FIG. 3 depicts a schematic of an exemplary protocol controller that can be included in the communication system.
Figure 4:
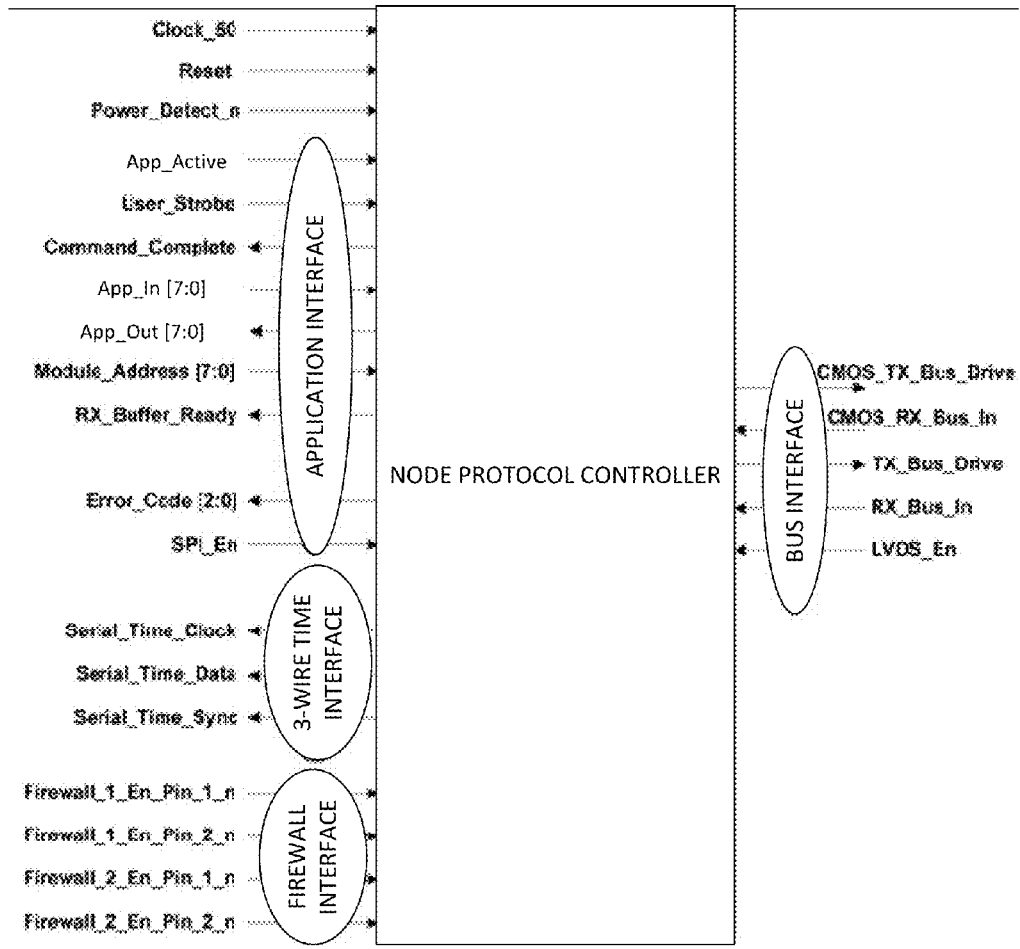
FIG. 4 depicts a schematic of a node signal/interface grouping.

An exemplary arbitration scheme 36 is depicted in FIG. 2. A unique feature of the arbitration scheme is that the data rate during arbitration is different than the data rate during normal data transmission. With more particularity, during normal data transmission, the packets 26 desirably travel at high speeds, allowing for near real-time control, regardless as to whether the packets travel over long distances. During arbitration, however, the nodes 26 transmit data at slower rates, wherein a different between the "normal" data rate and the slower data rate can be based upon lengths of cabling in the system 10 (e.g., a difference in length between shortest cabling and longest cabling in the system 10). Effectively, this allows for the nodes 16 to transmit data at high speeds over relatively long distances during normal transmissions, but ensures prevention of collision.

In an example, the transmitter node 16a wishes to transmit data over the bus, and monitors the bus for communications at 38 (e.g., will listen for communications from the hub 22). When the transmitter node 16a detects that the bus is idle for a threshold amount of time, the node 16a can initiate an arbitration process by transmitting a request for control of the bus to the hub 22 at 40. The node 16a, in this example, transmits the request at a first data rate (e.g., the slower data rate). During this time period, the transmitter node 16a waits to receive confirmation from the hub 22 as to whether the node 16a is able to transmit packets 26 over the bus, and remains idle. The hub 22 receives the request, and in this example, determines that the transmitter node 16a is able to transmit packets 26 over the bus. The hub 22 transmits a confirmation packet to the first node 16 at 42 (e.g., at a second data rate that is faster than the first data rate). The hub 22 further transmits packets to other nodes in the system 10 at 44 (e.g., the recipient node 16b), informing the other nodes that the transmitter node 16a has control of the bus. Responsive to receiving the confirmation, the transmitter node 16a becomes aware that it has control of the bus and can transmit packets 26 to other nodes (e.g., the recipient node 16b) by way of the hub 22, where the transmitter node 16b transmits the packets at the second (faster) data rate.

As indicated previously, the foundation protocol is well-suited for systems (such as the network system 10) that operate in harsh environments, yet require reliable transmittal of data between devices in the network system 10. The arbitration process described herein facilitates prevention of collisions, and further allows for differing cable lengths between nodes, and still further allows for transmittal of data between nodes at high speeds. For example, if the data rates were not differed, then a node in close proximity to the hub 22 could request control of the bus (where the request is transmitted at high speed), receive an indication from the hub 22 that the node has control of the bus, and thereafter send data packets 26 that collide with data packets transmitted from a different node that is positioned far from the hub 22. In an exemplary embodiment, the second data rate can be at least double the first data rate.

When both the first and second nodes attempt to control the bus, such nodes can transmit requests to the hub 22, and await a response from the hub 22. The hub 22 outputs data packets to the nodes 16 that identify which node has control of the bus, and the "winning" node, upon receipt of the data packet that indicates that it has control of the bus, transmits at high speed. Thus, for instance, the hub 22 can indicate that the transmitter node 16a has control of the bus, and the transmitter node 16a can transmit at a high data rate. The recipient node 16b retains the data that it wants to transmit, and waits for the bus to be idle (for the threshold amount of time) to submit another request for the bus to the hub 20. The recipient node 16b can continue to submit requests (when the bus is idle) until the hub 22 indicates it has control of the bus, or until some threshold amount of time has passed (e.g., 10 milliseconds), at which point in time the recipient node 16b can inform its application 14b (e.g., by way of its interface 18b) that it is unable to transmit data.

Returning to FIG. 1, additional detail pertaining to operation of the hub 22 is now set forth. The hub 22 transmits packets to all nodes 16 in the network system 10 to indicate to such nodes that the bus is being used by one of the nodes. For instance, the data transmitted by the hub 22 can be an address of the node in control of the bus. Furthermore, the hub 22 can be configured with fault detection capability, where the hub 22 is configured to identify fault conditions, auto-disable a link of the network system 10 believed to be failing, etc. For instance, if the hub 22 sees noise chattering, or certain behavior that is not conforming to predefined bit timing, the hub 22 can disable a port therein that is associated with that network link. In an exemplary embodiment, the hub 22 is not configured to analyze content of the payloads 28 when performing fault detection, but instead for searches certain elementary types of noise, and can disable ports when those types of noise are detected. The hub 22 can periodically reactivate the port to ascertain whether the noise has ceased, thus allowing for links of the network system 10 to be reconnected.

Moreover, while not shown, the network system 10 can include a sub-hub, where the sub-hub is coupled to a plurality of nodes, and directs communications to such nodes to the hub 22. Utilization of a sub-hub increases the number of devices that can be included in the network system 10.

Further detail pertaining to the data packets 26 is now set forth. The packets 26 transmitted from and received by nodes 16 in the system 10 include the header 30 and payload 28. The header 30 comprises the information for addressing the packet 26 in the system 10, such that the packet 26 reaches the intended recipient. The payload 28 comprises data that is to be consumed by a recipient device. In an exemplary embodiment, a transmitting node 16a can transmit a header 30 of a packet 26 to the recipient node 16b, whereupon the recipient node 16b performs a CRC check on the header 30. The recipient node 16b outputs a confirmation receipt that is received by the transmitting node 16a, resulting in the transmitting node 16a transmitting the payload 28. The recipient node 16b performs a CRC check on the payload 28 to ensure that the payload 28 has not been corrupted. The recipient node 16b, upon receiving the payload 28, confirms receipt. I the recipient node 16 fails to emit a confirmation receipt, the transmitting node 16a fails to continue transmitting packets 26.

Figure 5:
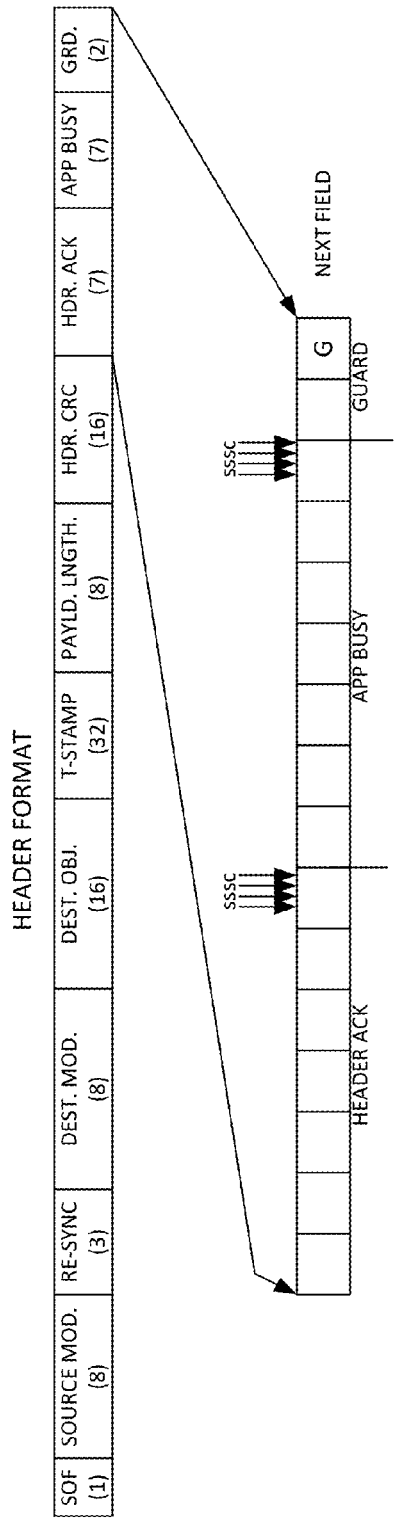
FIG. 5 depicts a schematic explaining the design of an exemplary packet header.

As shown in FIG. 5, an exemplary header 30 of a data packet 26 comprises numerous fields, composed of 119 bits (including bit stuffing). The addressing scheme allows for the possibility of addressing 256 nodes 14. Each field of the header 30 is outlined as shown in FIG. 5. The fields within the header 30 include: 1) start of frame, 2) source module, 3) re-sync, 4) destination module, 5) destination object, 6) timestamp, 7) payload length, 8) header CRC, 9) header ACK, 10) application busy, and 11) guard. Each field in the packet 26 is shown as being a particular number of bits in size. Each bit can be driven on the line for one bit time, except for the source module, where each bit can be driven for two bit times, with a bit time defined as being five clock cycles in length. Logic '0' on a bus line can be defined as the bus line being DOMINANT. Logic '1' on a bus line can be defined as the bus line being RECESSIVE.

The bus may exhibit a recessive state until the receiving node 16b that is in control of the bus transmits an acknowledgement (ACK). Bit stuffing starts with a bit inserted immediately before the destination node field. Bit stuffing then inserts a stuff bit after every header byte and ends after the bit stuff following the last byte of the header CRC. The header ACK field and application busy field are not included in the bit stuff. Bit stuffing resumes with a bit stuff inserted immediately before the first payload byte, and inserts a bit stuff after every payload byte, ending after the bit stuff following the last byte of the payload CRC.

The Start-of-Frame (SOF) field identifies the start of a frame and is 1 bit. This bit time can provide the event that nodes 16 can use to start packet processing. The SOF can be detected when the bus goes from the bus idle (sometimes called "inter-packet state") to the active state when the bus is driven dominant for one bit time after the bus idle state. The falling edge on the bus receive line when the bus is determined to be idle constitutes the start of the SOF, but the SOF field need not be sampled at any other point.

The source module field takes up 8 bits and identifies the device or node that originates the packet 26. Arbitration occurs in this field, with, for example, the node having the lowest address being given the highest priority.

The Re-sync field is a +1 bit stuff immediately following the field and allows the receiving node 16 to re-sync with the transmitting node 16 that wins during an arbitration process. The field goes recessive for two bit times, then drives dominant for one bit time, which forces re-sync. The re-sync field is utilized to synchronize the node 16 after arbitration. If the re-sync field is changed, then the data 28 will be decoded incorrectly and the packet 26 should not be received by the recipient application 14.

The destination module field is 8 bits+1 bit stuff immediately following such bits. The destination module field identifies the node or device that is to receive the packet 26.

The destination object ID field is 16 bits+1 bit stuff immediately following each byte and identifies the object (e.g., application) within the destination device that is to receive the packet 26. The destination object addresses in the range 0X0000-0X000F can be reserved for internal node diagnostic use and are used by external users.

For testability reasons, a bus monitor or a telemetry system can be included, and coupled to the hub 22. The header structure can be designed to provide a method of fingerprinting every packet 26 viewed on the bus by the bus monitor or the telemetry system. This allows for identifying the transmitting node 16 that sent the packet 26, the destination node 16, and the destination object to which the packet 26 was addressed.

The Timestamp field is 32 bits+1 bit stuff immediately following each byte. This field is automatically added to the packet 26 when the send request line at an input port of the communications board that is coupled to the application 14 is asserted by the sending node 16 internal state machine. This provides a method of generating a timeline of events when post processing data. In addition, the bus monitor can time stamp the packet 26 when the packet 26 reaches the hub 22 (e.g., when the monitor sees the packet). This permits an analysis of hold-off delays.

The Payload Length field is 8 bits+1 bit stuff immediately following the field. The payload length field indicates the number of bytes that are included in the payload section 28 of the packet 26. In an example, internal nodes 16 can be restricted to 256 byte packet receptions. To calculate payload length: Length=number of payload bytes −1.

The Header CRC field is 16 bits+1 bit stuff immediately following each byte. The Header CRC field protects the system 10 from accepting misaddressed packets 26 that could be caused by a bit changing state in the header field while the packet 26 is being sent across the physical layer of the bus. Addressing errors are detected and bad packets 26 are discarded. The CRC calculation skips the SOF field and starts with the first bit of the source module field. It then pauses after including the last bit of source module field. It skips re-sync field 3 bits and resumes on the first bit of the Destination Module field. It ends after calculating the last bit of the Payload Length field.

The Header ACK field is 7 bits, with no bit stuff. The Header ACK allows the receiver node 16b to handshake with the transmitter node 16a and indicate whether the recipient node 16b accepts the header portion of the packet 26. The header ACK field is driven recessive by the transmitter node 16a for the 7 bit times, but will be overridden by the recipient node 16b if an acknowledge is sent.

If the recipient node 16b is able to accept the packet 26 because there is no CRC or bit stuff error, it will drive the bus dominant as soon as it determines that the packet 26 is valid and error free. The transmitting node 16a can sample the last three clock cycles of the $7^{th}$ bit of the ACK field to determine if the recipient node 16b has acknowledged the header. All three of these sample points are to be seen as dominant in order for the transmitter node 16a to continue.

The system 10 is capable of a blind broadcast function where the ACK fields are disabled. Blind broadcasts are used for testing purposes and provide greater bandwidth. With blind broadcasts, the application 12a can broadcast information so that it shows up on the bus so it can get tested, but without anybody on the bus 20 being able to receive it, other than the testing device.

The system 10 is also capable of a global broadcast, where receiving nodes 16 will respond during the ACK fields. During a global broadcast, if the recipient node 16b already has a packet 26 in its RX buffer, the recipient node 16b will not accept the packet 26 and no error will be indicated by the transmitting node 16a since the transmitting node 16a does not check the busy field on a global broadcast. An auto response can be built into the application 14s of the nodes 16 to provide the transmitter node 16b assurance that each node 16 received the global broadcast. The global broadcast permits the transmission of a single message to all the nodes 16.

The Application Busy field is 7 bits, with no bit stuff. Bit state is driven by the recipient node 16b. The internal state of busy is sampled at SOF and reported at this bit time. Dominant means that the recipient node 16b is busy while recessive means that the recipient node 16b is not busy. The app busy field is driven recessive by the transmitter node 16a during the 7 bit times, but will be overridden by the receiving node 16b if the receiving node 16b is not able to accept the packet 26 because its receive buffer was not empty when the SOF field was sent. If the destination application 14b is currently busy (only if the receive buffer is not empty) and is not able to process the packet 26, the receiver node 16b will drive the line dominant and override the transmitter node 16a. The transmitter node 16a will sample the last three clock cycles of the $7^{th}$ bit of the busy field to determine if the receiver node 16b has acknowledged the header. All three of these sample points can be seen as recessive (destination application not busy) in order for the transmitter node 16a to continue. If this bit is found to be dominant at any of the three sample times, the transmitter node 16a stops transmitting the packet 26. This provides feedback to the application 14a as to why the header was not accepted (receiver is busy).

The Guard field is 2+1 bit stuff immediately following the field. The Guard field is provided to account for cable and round trip delays and to protect the start of the time stamp field by preventing any overlapping from a hand shaking receiver node 16b. The transmitter node 16a will drive its line recessive during this field and the receiver node 16b does not check this field.

Figure 6:
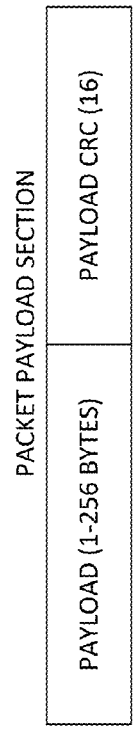
FIG. 6 depicts a schematic representing an exemplary packet payload.

The Payload section 28 of the packet 26 is where the application data can be transferred and includes two fields: the Packet Payload and the Packet CRC. The fields that make up the application section and CRC of the payload are depicted in FIG. 6.

The Packet Payload field is also referred to as the application payload. The Packet payload is 8 bits*Payload Byte Number+1 bit stuff immediately following each byte. The Packet Payload is variable to allow sending the required amount of data that is being requested to be sent by the application 14a. The information is typically sent in block moves in the payload. The Packet Payload is the data being transferred between applications 14 across the bus. The objects are defined by the applications 14 on a per node basis. Objects are a tag to identify the type of data in the payload 28. The nodes 16 move blocks of data between objects and do not have any knowledge of the objects' structure. Objects have depth and reside at one address. The depth is limited by the maximum payload length. Payload length is a big driver of first in, first out (FIFO) memory size requirements. The normal payload length is 1 to 256 bytes for all internal communications between nodes and any external to internal communications. Bit stuffing in the packet payload section inserts a bit stuff immediately before the first byte of the payload, and immediately after every byte in the payload and CRC. Bit stuffing stops at the end of the CRC.

The Payload CRC field is 16 bits+1 bit stuff immediately following the field. The Payload CRC field is the calculated CRC as sent by the transmitting node 16. The CRC is calculated starting with the first bit of the packet payload byte and ending with the last bit of the last packet payload byte.

Figure 7:
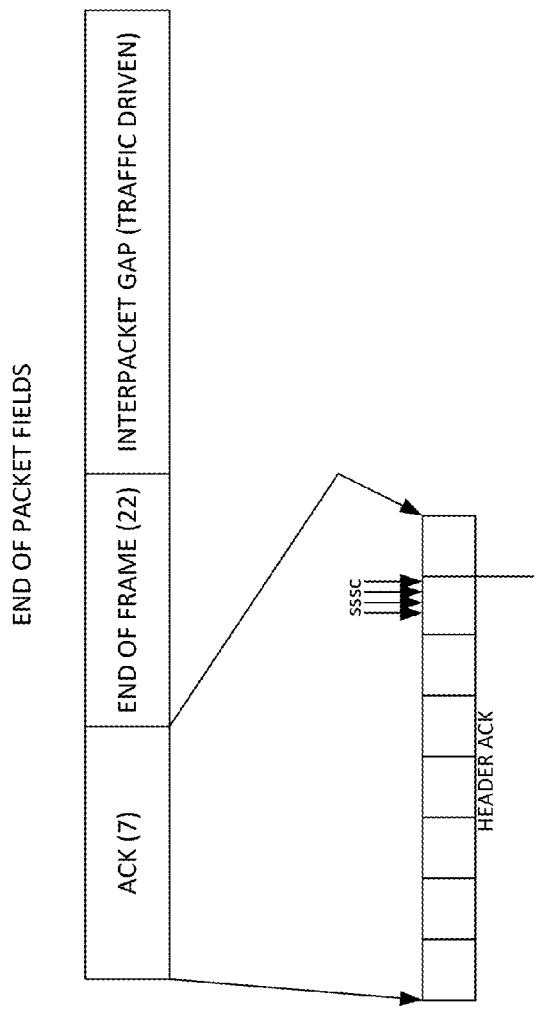
FIG. 7 depicts a schematic of exemplary end of packet fields.

There are three fields that comprise the end of the packet structure. They include End of Frame, Inter Packet Gap, and Payload ACK. This is the portion of the packet 26 that signals that the transmitting node 16a is completing the transaction, as shown in FIG. 7.

The Payload ACK field is 7 bits and the transmitting node 16 drives the payload ACK field recessive during this field. The receiving node 16b drives the payload ACK field dominant as soon as the CRC check is complete and the packet is accepted, this overwrites the recessive value the transmitting node 16a was putting out on its line during this field. The receiving node 16 releases the ACK line at the end of the 7th bit time. The transmitting node 16a samples the header field on the three clock cycles before the end of the seventh bit time. All three samples should agree that an acknowledgement was received, otherwise an acknowledge error will occur. Both the header CRC and payload CRC should pass and no frame errors or bit-stuff errors should have occurred. If any one of the listed errors occurred, the receiving node 16b can reject the packet.

During global/blind broadcast, the transmitter node 16a drives the ACK dominant as ACK fields are not driven by the receiving nodes. The ACK field is ignored by the transmitting node 16 for global/blind broadcasts (see Error! Reference source not found.7).

The End of Frame field is 22 bit times. The transmitting node 16 drives the bus recessive for this part of the packet 26. No other transmitters can drive until 22 bit times have elapsed. If any transmitter node attempts to drive the bus during this time, the receiving node 16b will not process the packet 26.

Figure 8:
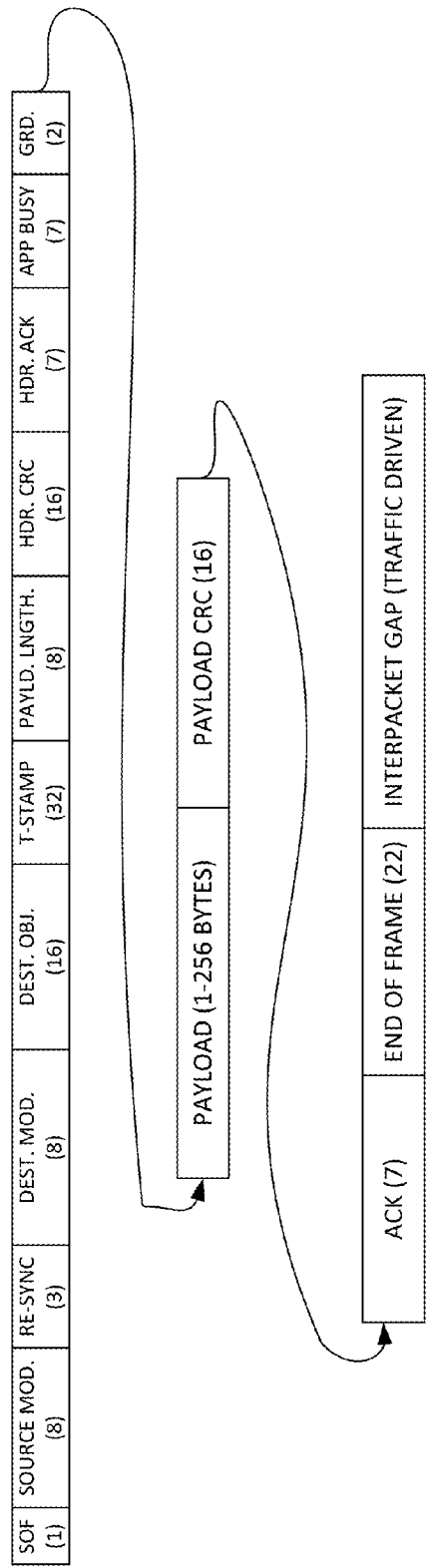
FIG. 8 depicts a diagram showing exemplary packet fields.

The Inter Packet Gap field is traffic-driven. The spacing between transmissions varies depending on the phase of equipment operation (mission bus) or activity on the instrumentation bus (non-mission bus). FIG. 8 shows all the fields and their order of occurrence, but does not include individual bit stuff bits. Table 2 depicts the packet breakdown by number of bits (a full length packet).

TABLE 2

FOUNDATION PACKET BREAKDOWN BY BITS

| Header Field | Bits | Stuff Bits | Total | |
|---|---|---|---|---|
| SOF | 1 | | 1 | |
| Source Module | 8 | | 8 | |
| Re-Sync | 3 | | 3 | |
| Stuff Start Bit | | 1 | 1 | |
| Dest Module | 8 | 1 | 9 | |
| DestObj | 16 | 2 | 18 | |
| Timestamp | 32 | 4 | 36 | |
| Payload Length | 8 | 1 | 9 | |
| Header CRC | 16 | 2 | 18 | |
| Header ACK | 7 | | 7 | |
| App Busy | 7 | | 7 | |
| Guard | 2 | | 2 | |
| Header Bit Length | 108 | +Stuff | 119 | |

| Payload Field | Bits | Stuff Bits | Total | |
|---|---|---|---|---|
| Stuff Start Bit | | 1 | 1 | 256 |
| Payload | 2048 | 256 | 2304 | |
| Payload CRC | 16 | 2 | 18 | |
| ACK | 7 | | 7 | |
| End of Frame | 22 | | 22 | |
| Payload Bit Length | 2093 | +Stuff | 2352 | |
| Packet Bit Length | 2201 | +Stuff | 2471 | |

As previously discussed, the foundation protocol includes employment of the interface 18. The interfaces 18 provide a relatively simple interface port for the applications 14 to send and receive packets 26 over the bus. The applications 14 can interface with their respective nodes 16 via byte-wide input and output ports, and a set of handshake lines. Two modes of operation can be available via this interface: parallel and serial peripheral interface (SPI) modes.

The interface parallel mode can be employed for fast transfers and large block moves. This parallel mode of operation is sometimes referred to as high-speed mode since it allows the application to load/read an entire byte with only one toggle of the appropriate control lines. Hence, the speed of data transfers is much faster than in SPI mode.

SPI mode can be used for interfacing microprocessors with the node 16 or for applications that have pin restrictions since it requires fewer input/output (I/O) pins than the parallel mode. The tradeoff is that the transfer speeds in this mode may be slower than in parallel mode. SPI mode allows the applications 14 to load/read data from the bus serially (one bit at a time); hence, only one pin is needed for the data input and one pin for the data output as opposed to eight pins in the parallel mode.

There are 254 addresses available for general use within the protocol. Two addresses can be set-aside to support testing needs. The node logic is designed to prevent the applications 18 from setting the node address to 0X00 or 0XFF. Handshaking can be disabled for the two reserved addresses.

Reserved address 0XFF can be used for blind broadcast to the bus monitor. This address allows for higher data transfer rates for ground mode instrumentation. It requires the use of the bus monitor for operation and provides a standard address for diagnostic dumps.

Reserved address 0X00 is used for global broadcasts. All nodes 16 will listen for and receive packets sent to this address.

The interfaces 18 include commands that are defined to indicate to the nodes 16 what type of action to take. The node timing intervals are shown in Table 3, assuming that the nodes 16 and applications 14 are operating on 50 MHz clock(s).

TABLE 1

Node Timing Intervals

| Symbol | Applicable Mode | Parameter | Min | Max | Units |
|---|---|---|---|---|---|
| t_data | Parallel | Time between the input data being valid on User_In and the assertion of User_Strobe | 0 | — | Ns |
| t_ua_us | Parallel | Time between the assertion of User_Active and the assertion of User_Strobe. | 0 | — | Ns |
| t_us_cc | Parallel | Time between the assertion of User_Strobe and the assertion of Command_Complete | 20* | 40* | Ns |
| t_us_down | Parallel | Time between the assertion of Command_Complete and the de-assertion of User_Strobe | 20 | — | Ns |
| t_cc_down | Parallel | Time between the de-assertion of User_Strobe and the deassertion of Command_Complete | 20* | 40* | Ns |
| t_cc_us | Parallel | Time between the de-assertion of Command_Complete and the assertion of the next User_Strobe | 20 | — | Ns |
| t_data_avail | Parallel | Time between the deassertion of Command_Complete and the next byte of data being placed on User_Out during a read command. | 20 | 20 | Ns |
| t_ua_down | Parallel | Time between the de-assertion of Command_Complete by the node and the application de-asserting User_Active | 20 | — | Ns |
| t_out_done | Parallel | Time between the de-assertion of User_Active and the de-assertion of the User_OE bus (if asserted) | 0* | 20* | Ns |
| t_idle | Parallel/SPI | Time that User_Active/Slave_Select must remain de-asserted between commands | 60 | — | Ns |
| t_sclk | SPI | Time between the assertion of Slave_Select and the first strobe of SCLK Time between the last strobe of SCLK and the de-assertion of Slave_Select | 160 | — | Ns |

TABLE 1-continued

Node Timing Intervals

| Symbol | Applicable Mode | Parameter | Min | Max | Units |
|---|---|---|---|---|---|
| t_sclk_period | SPI | The period of SCLK | 10 Hz | 6 MHz | — |
| t_out_en | SPI | Time between the assertion of Slave_Select and the assertion of User_OE(1) OR time between the de-assertion of Slave_Select and the de-assertion of User_OE(1) | 0* | 20* | Ns |
| 0t_watchdog | Parallel/SPI | Time period after which a node that repeatedly fails to gain access to the bus will stop and throw an error flag. Watchdog counter starts sometime between the transmit command being received, and the beginning of the first SOF. | 10 | 10 | Ms |

Figure 9:
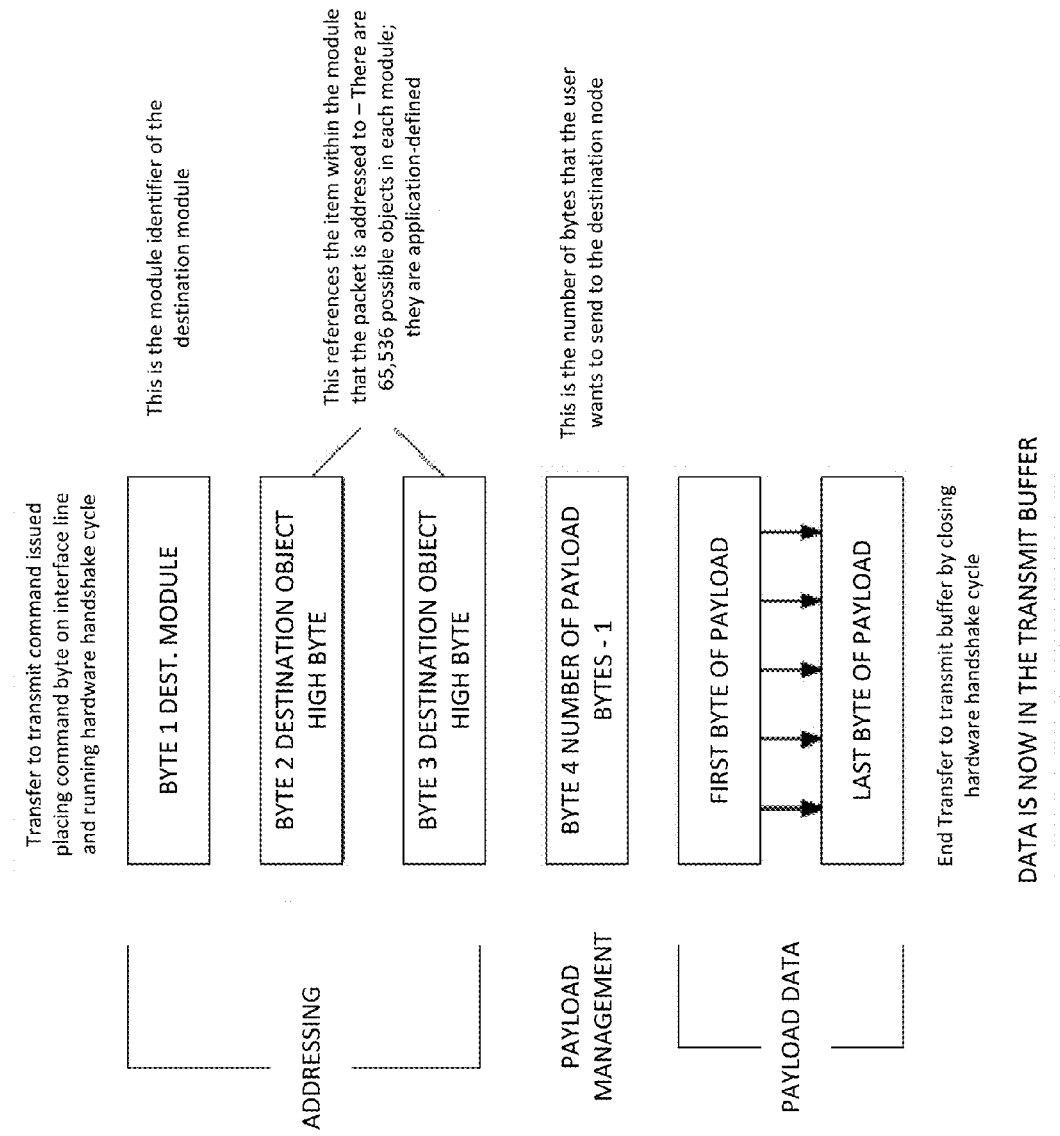
FIG. 9 depicts an exemplary load transmit buffer format.
Figure 10:
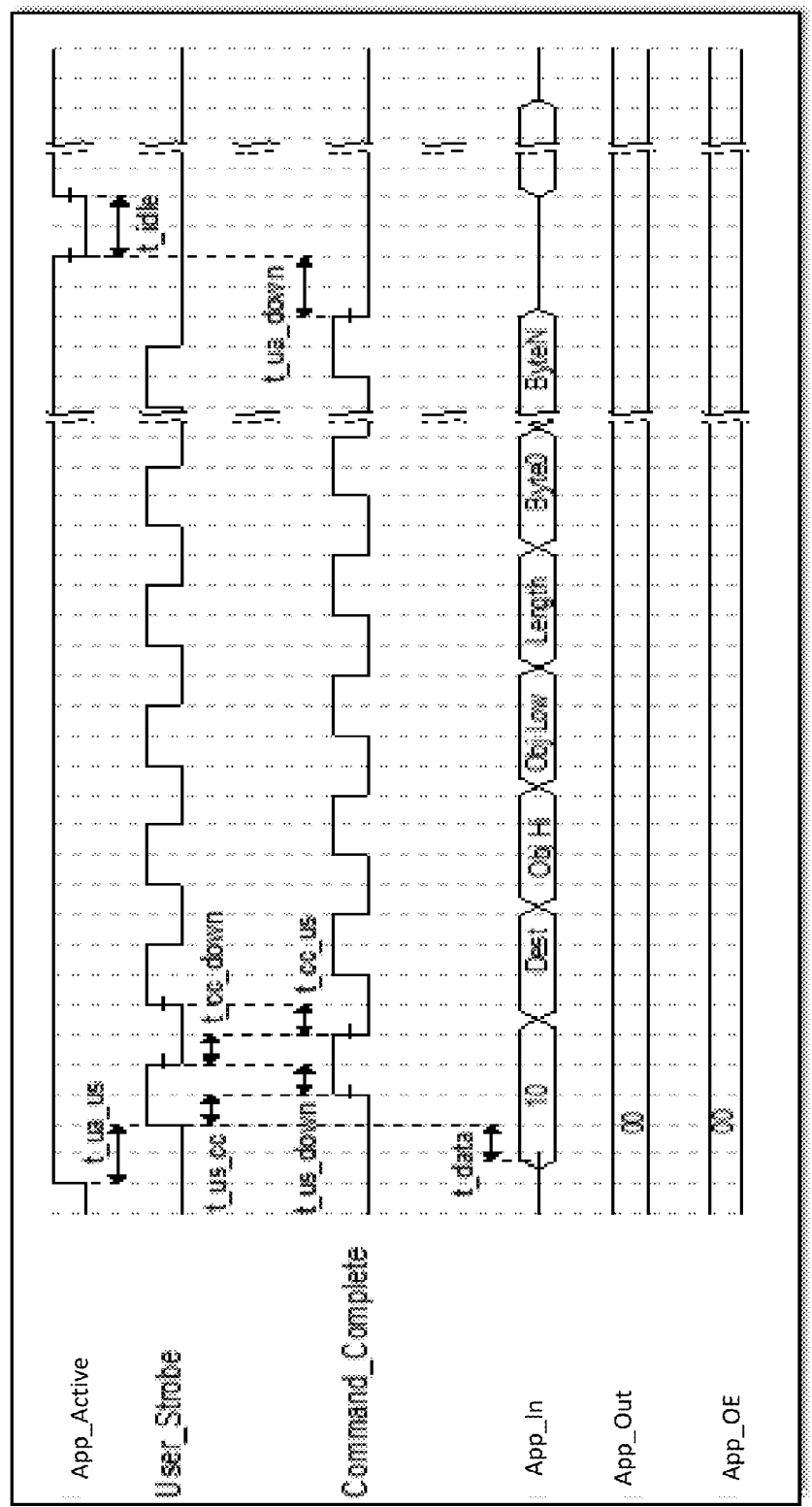
FIG. 10 depicts a schematic of an exemplary parallel mode write TX buffer.
Figure 11:
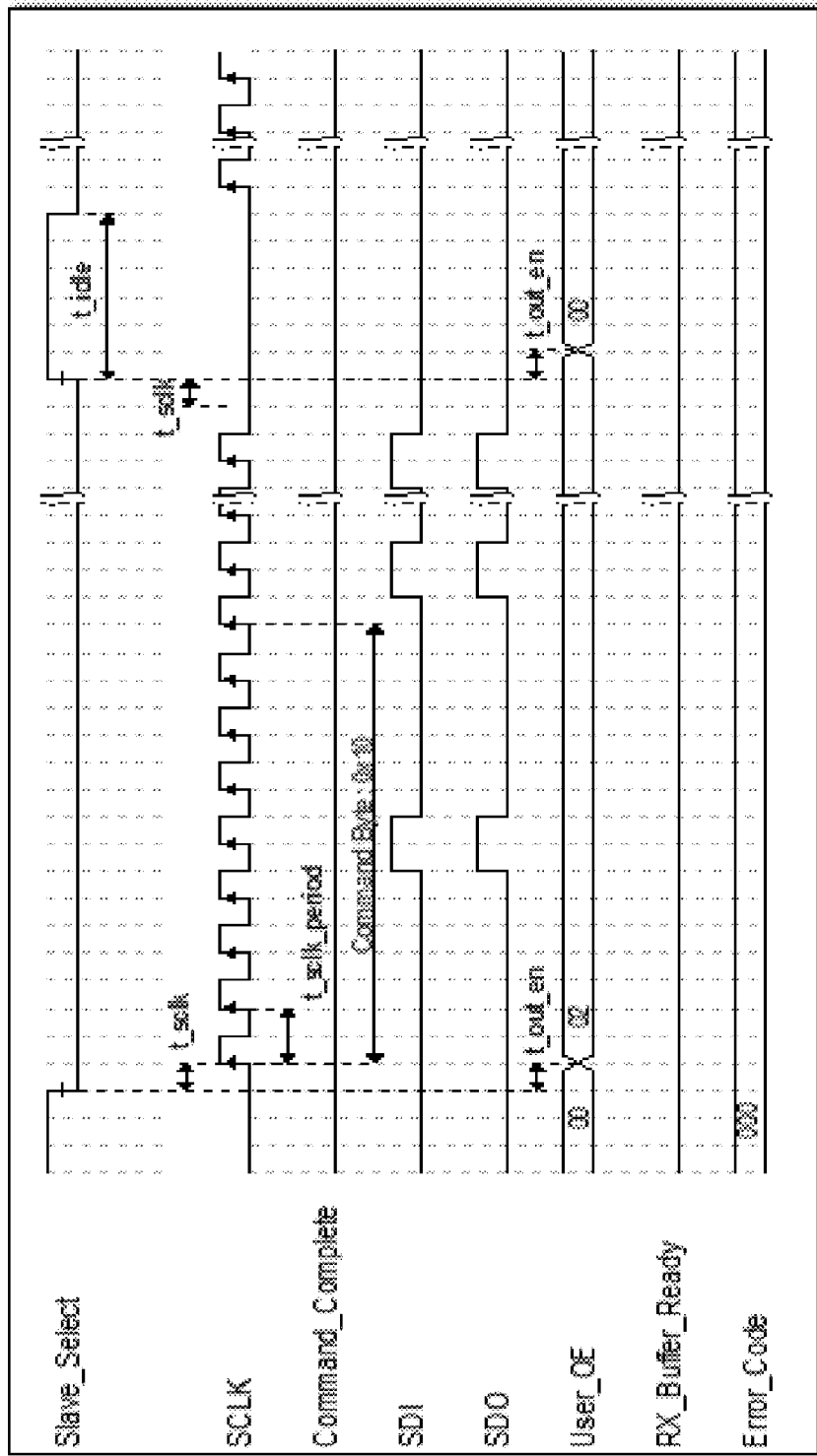
FIG. 11 depicts a schematic of an exemplary parallel mode write TX buffer.

Write, read, and transfer buffers are utilized in transferring packets across the bus. A transfer buffer to node command is required in order to request the send process. This gives the receiving application 14b the opportunity to abort the send process or preload data for a future send request (use the node 16b as the data buffer as data becomes available). Data bytes may be written to the node 16b in an order, as shown in FIG. 9. The parallel mode write TX buffer is represented in FIG. 10. The SPI mode write TX buffer is represented in FIG. 11.

Figure 12:
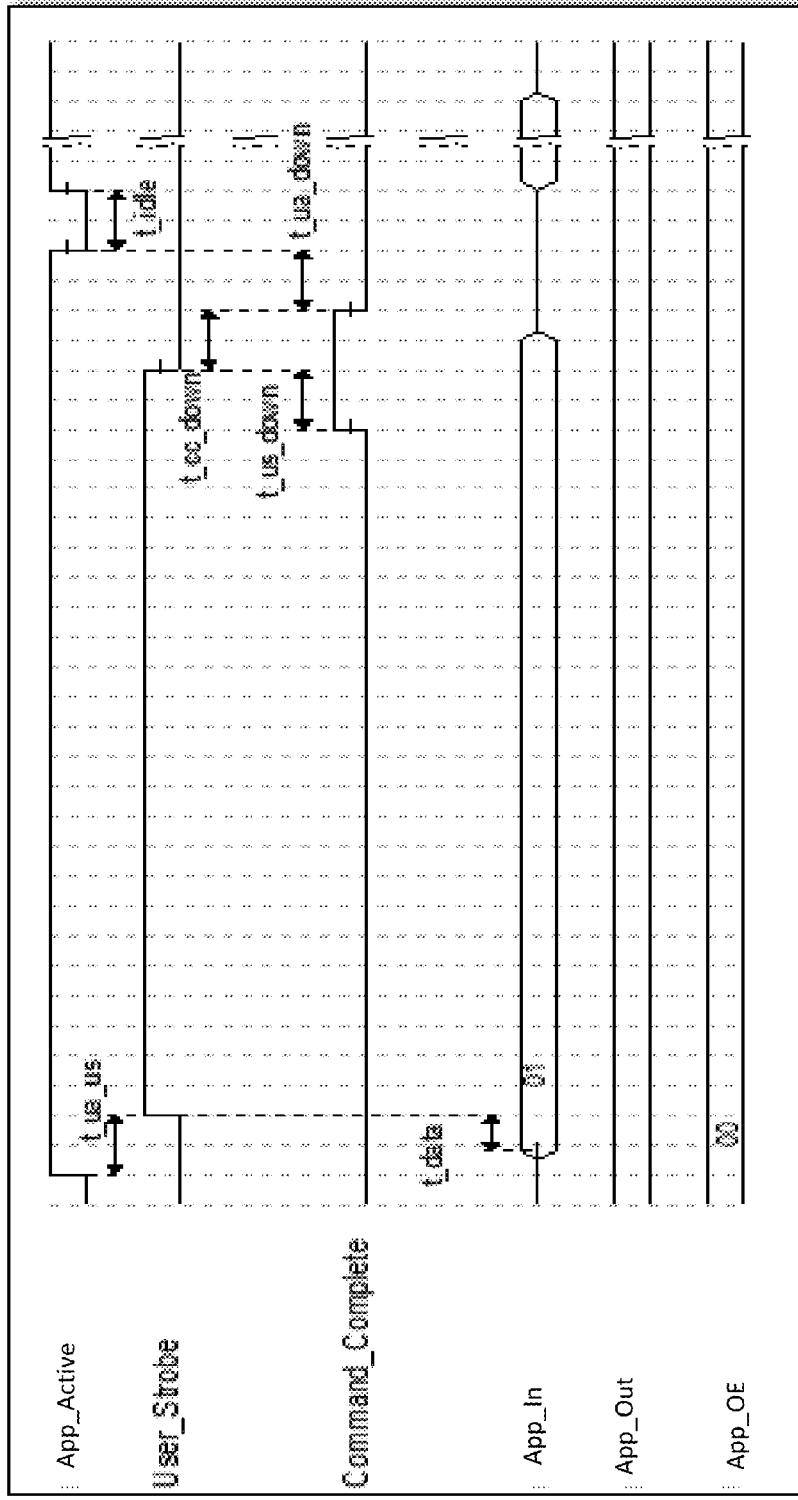
FIG. 12 depicts a schematic of an exemplary parallel mode transfer TX buffer.
Figure 13:
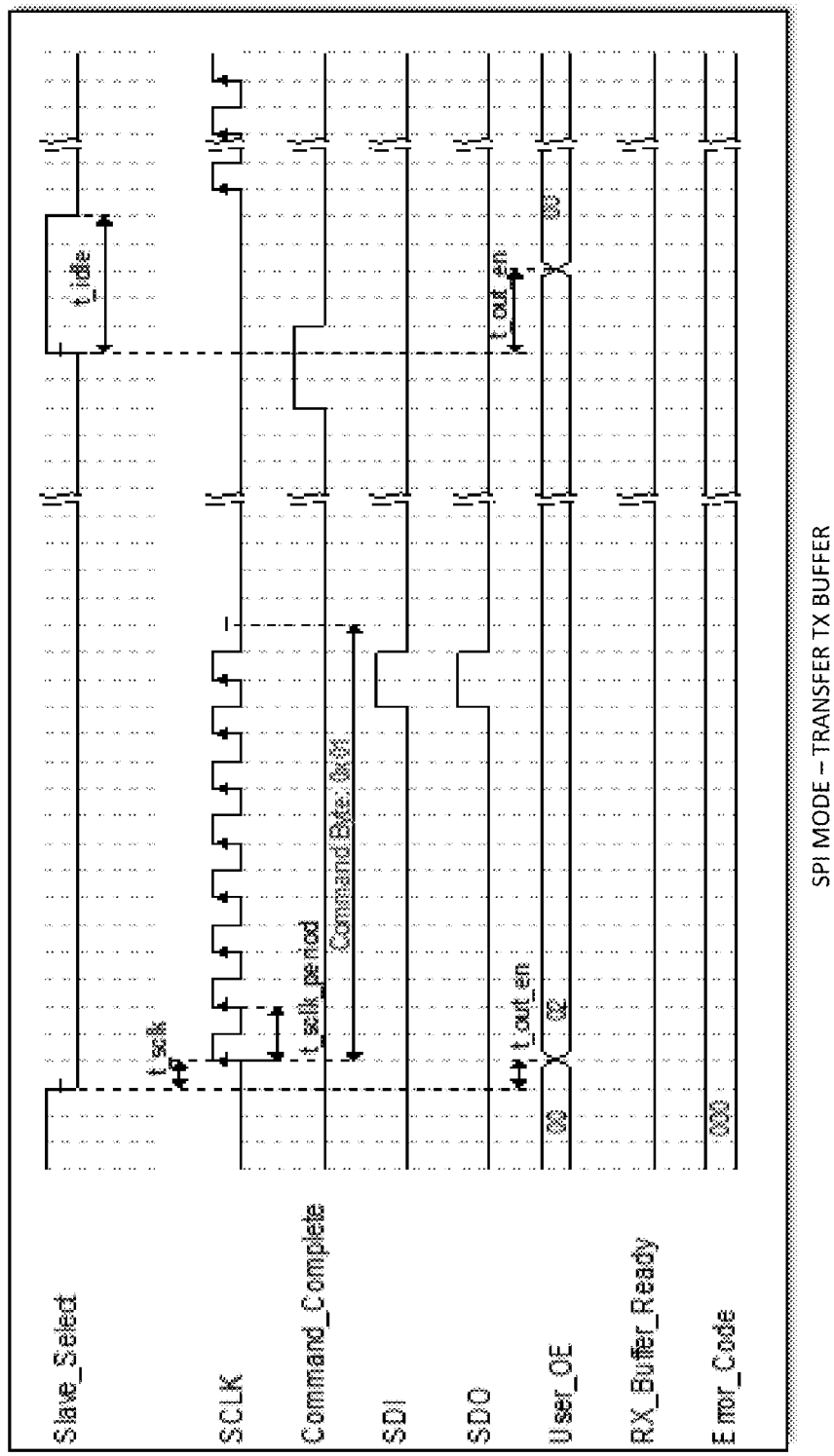
FIG. 13 depicts a schematic of an exemplary serial peripheral interface transfer TX buffer.
Figure 14:
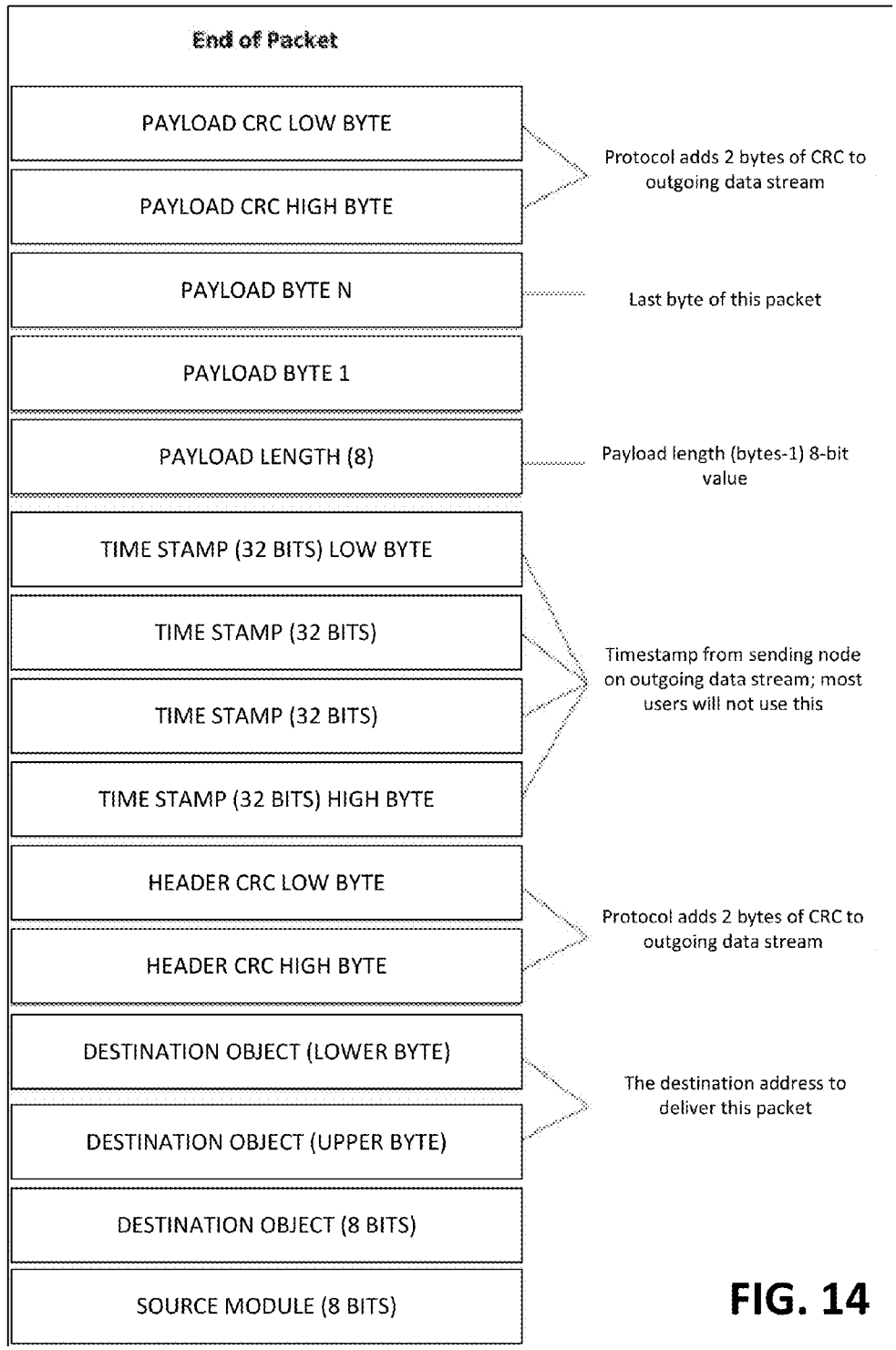
FIG. 14 depicts a diagram illustrating an exemplary read packet data format.
Figure 15:
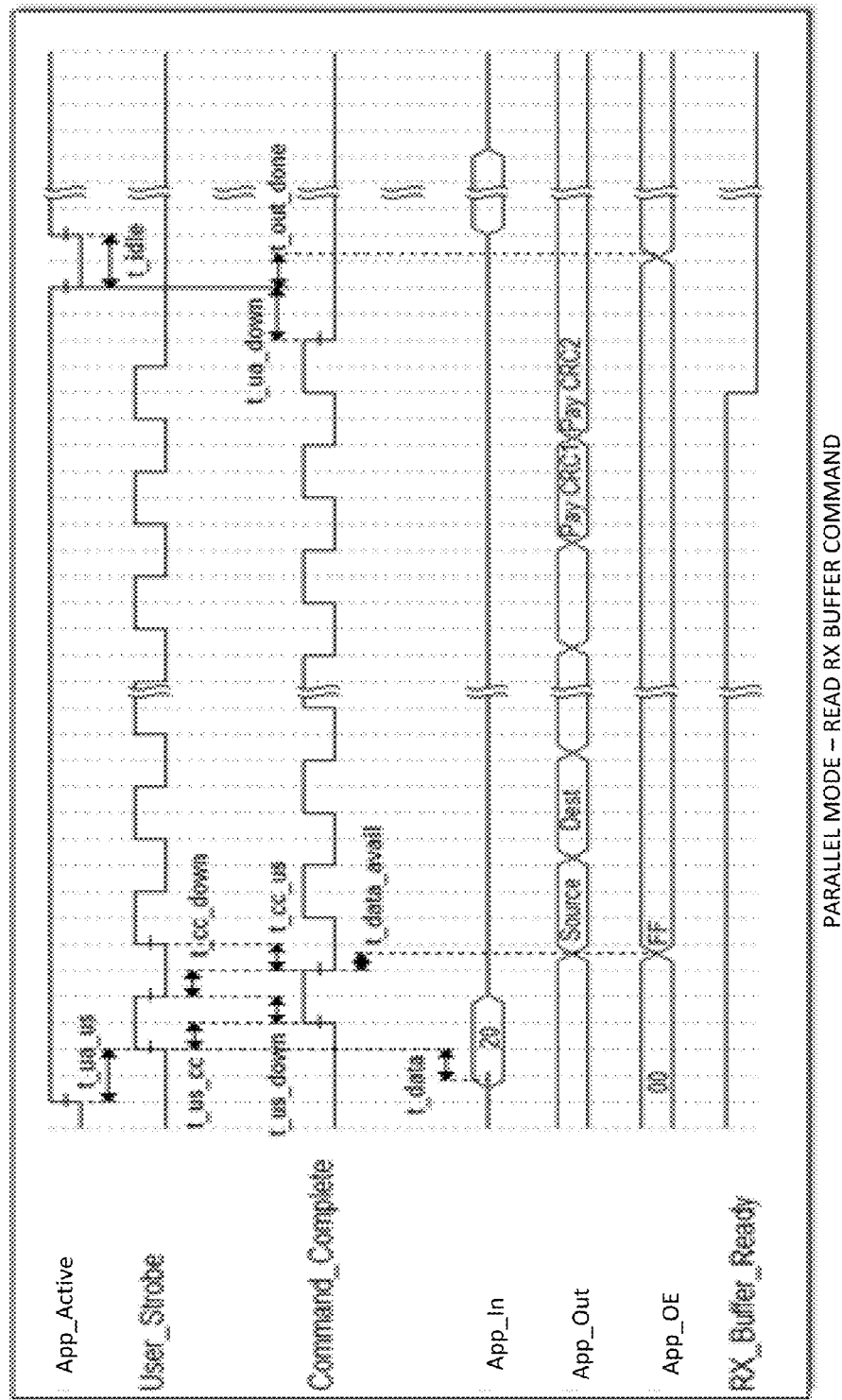
FIG. 15 depicts a schematic of an exemplary parallel mode RX buffer command.
Figure 16:
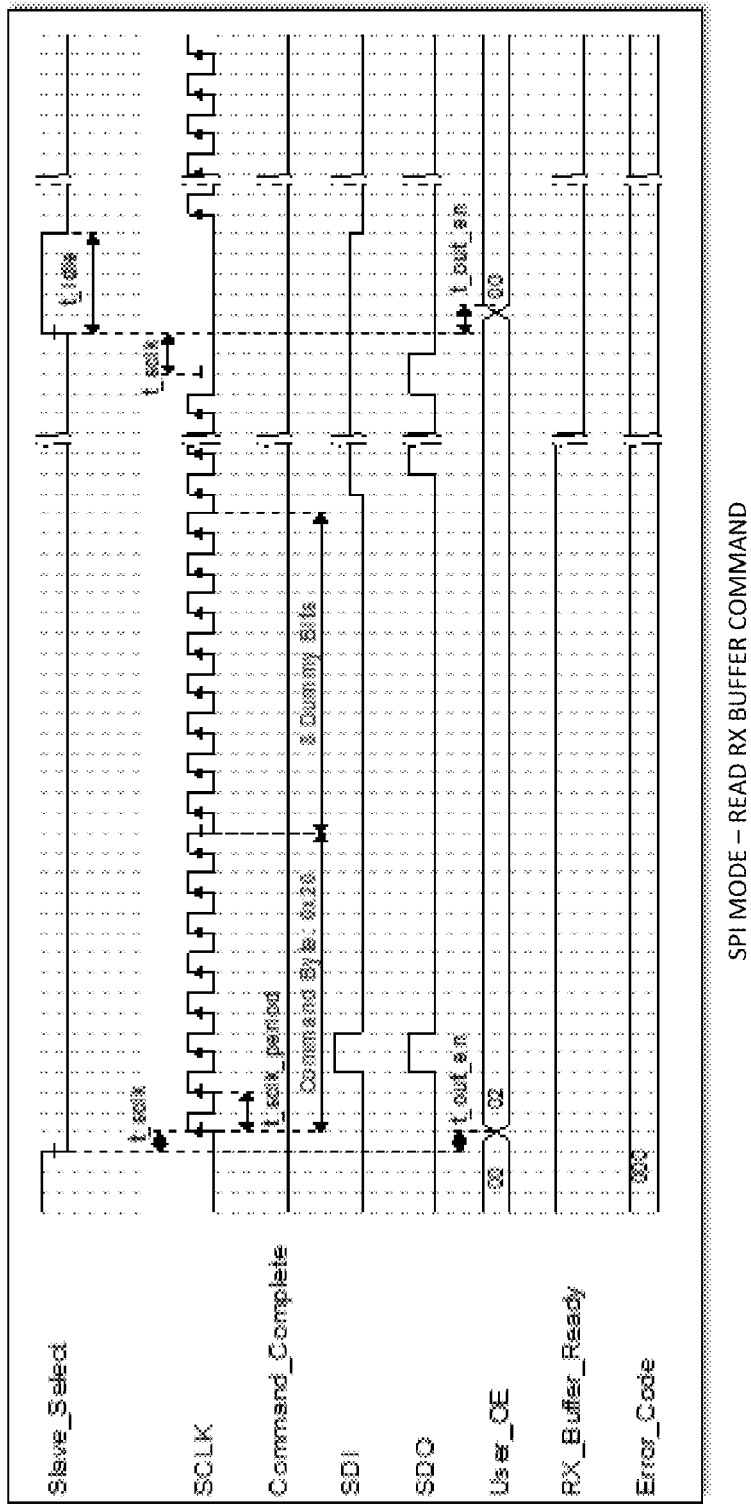
FIG. 16 depicts a schematic of a serial peripheral interface read RX buffer command.

A Transfer TX Buffer command causes the node 16b to return the status of the transfer on Error_Code(2:0) when an error state is detected (see Table 6). The parallel mode transfer TX buffer is represented in FIG. 12. The SPI mode transfer TX buffer is represented in FIG. 13. When the node 16b indicates that a packet 26 is ready, the packet may be transferred. FIG. 14 depicts the order that data bytes are sent out by the node 16b on a read command. FIGS. 15 and 16 depict Read RX buffer command examples in parallel mode and SPI mode, respectively.

Figure 17:
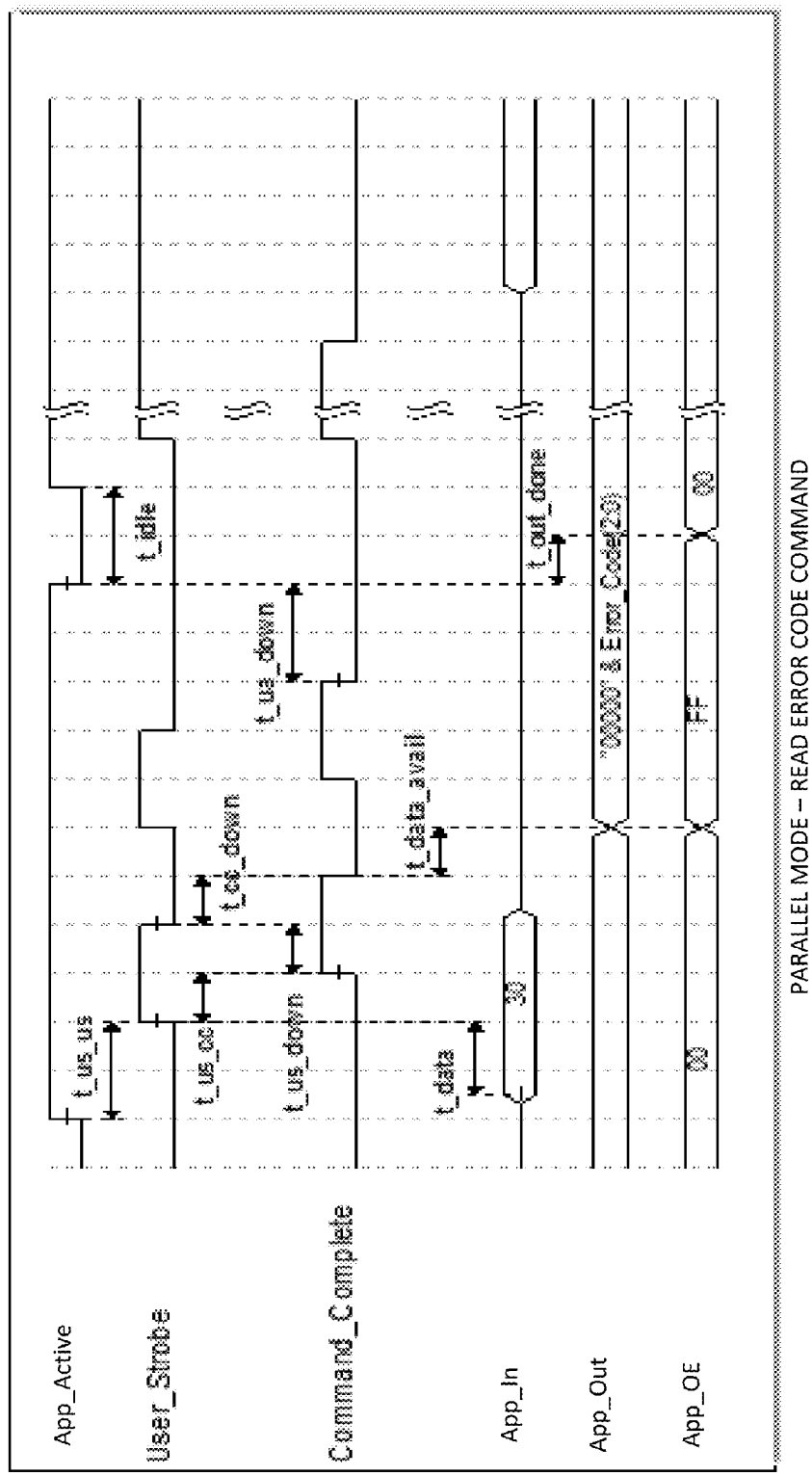
FIG. 17 depicts a schematic of an exemplary parallel mode read error code command.
Figure 18:
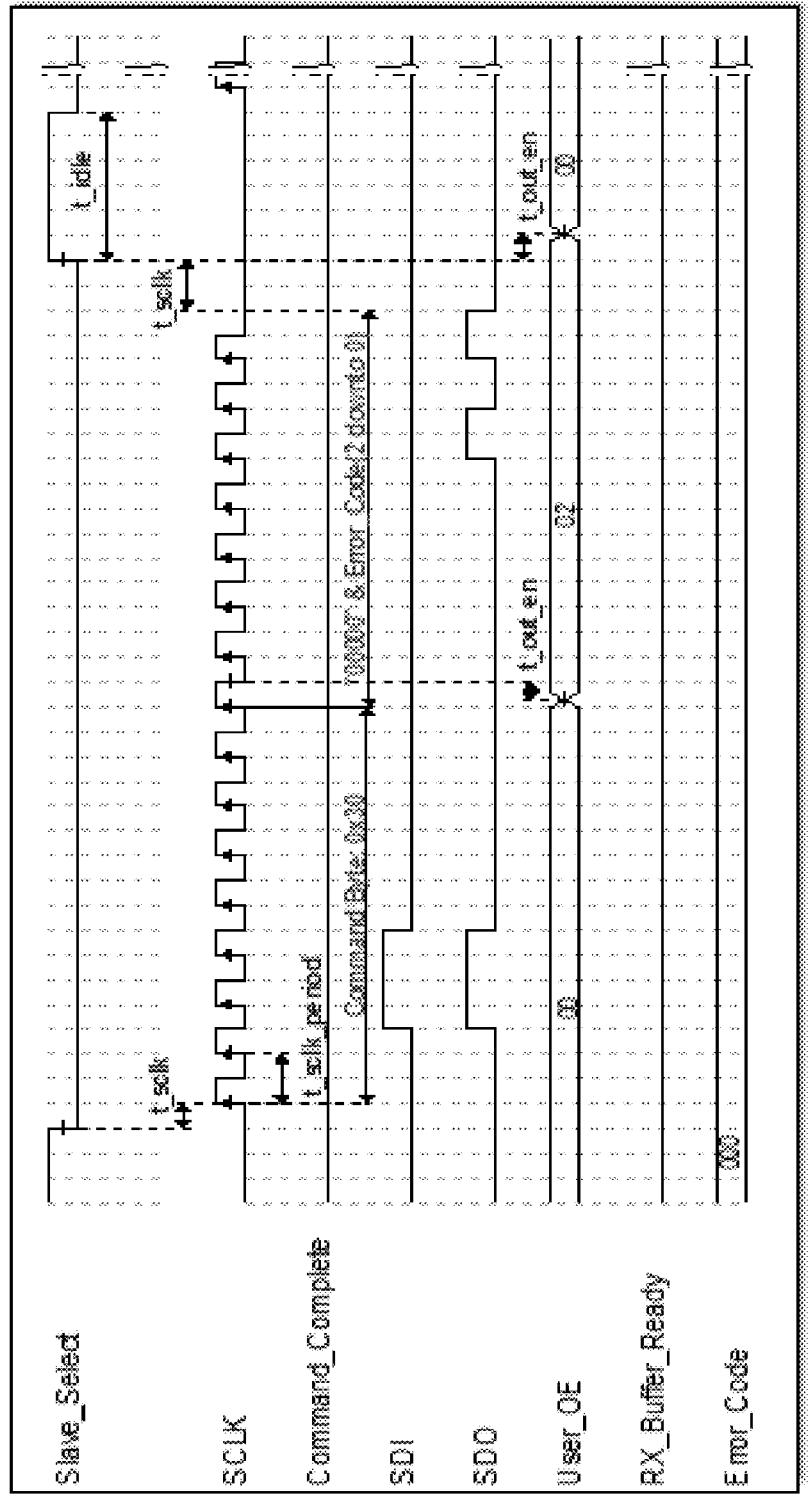
FIG. 18 depicts a schematic of a serial peripheral interface read error code command.

Error codes are utilized during the read commands in order to indicate that an error has occurred in the process. FIGS. 17 and 18 depict examples of Read Error Code Commands for parallel mode and SPI mode, respectively. Some of the interface signals have a dual use depending on what mode the Foundation bus is operating in. User_0Active, User_Strobe, User_In(0), and User_Out(1) are all used to drive the input/output and SPI clock lines used in SPI mode. Table 4 shows the signals used in a dual function and the signals they represent. The SPI timing information is in Table 5.

TABLE 2

Dual Role of Interface Lines

| Dual-Function Hardware Line | SPI Mode | High-Speed Parallel Mode |
|---|---|---|
| User_In (7 downto 0) | User_In (0) is used as the input (SDI) User_Out (1) is used as the output (SDO) | User_In (7 downto 0) and User_Out (7 downto 0) are used as the byte inputs and outputs |
| User_Out (7 downto 0) | User_In/Out(7 down to 2) become inactive (Zstate) | |
| Application active/Slave select | Used as Slave_Select line (active low) | Used as User_Active line |

TABLE 2-continued

Dual Role of Interface Lines

| Dual-Function Hardware Line | SPI Mode | High-Speed Parallel Mode |
|---|---|---|
| Dual-Function Hardware Line | SPI Mode | High-Speed Parallel Mode |
| User_strobe/SCLK | Used as SCLK | Used as User_Strobe |
| User power detect | Ground if not used | Ground if not used |

TABLE 3

SPI Timing Information

| Waveform Annotation | Name | Value | Notes |
|---|---|---|---|
| 1 | Slave Select assert to first SCLOCK Edge | Min 100 ns | Slave select must assert before start of first SCLK. Slave select must stay asserted during entire transfer. De-asserting slave select signals end of transfer cycle. Slave select is active low. |
| 2 | SCLK Period | Fastest SCLK allowed is 1/8 of node clock period; Slowest transfer rate = .1 second (10 Hz). | Frequency of SCLCK and port transfer rate. Note: The Application can stop the SCLCK during the transfer to pause the transfer. The only restriction is that a current SCLK cycle must complete. If the transfer is paused, slave select must stay asserted. |
| 3 | Transfer Time (assuming not SCLK pauses) | = 1/Item 2 * number of bits to transfer | Transfer time for all bits of transfer. Bits are sent MSB first. |
| 4 | Last SCLK to slave select de-assert. | Min 100 ns | Last SCLK cycle should complete before slave select de-asserts. |

TABLE 3-continued

SPI Timing Information

| Waveform Annotation | Name | Value | Notes |
|---|---|---|---|
| SDI | SDI (Serial Data In) | Stable for one bit time of SCLK | Input to node from SPI master. SPI Master asserts value on falling edge of SCLK. Node (slave) reads state on rising edge of SCLK. |

TABLE 4

Error Codes

| | | | |
|---|---|---|---|
| Transmitter Error Codes (lower 3 bits) | 2 | 1 | 0 |
| No Error | 0 | 0 | 0 |
| Header Not Acknowledged | 0 | 0 | 1 |
| Destination Node Busy | 0 | 1 | 0 |
| Payload Not Acknowledged | 0 | 1 | 1 |
| Bus Time Out | 1 | 0 | 0 |
| Cause: Bus time out because node could not get bus (win arbitration). This could be due to too much traffic on the bus from nodes with higher priority, a broken cable, or disabled hub port. | | | |
| TX Buffer was empty | 1 | 0 | 1 |
| TX FIFO is found empty when a Transmit TX Buffer command is issued | | | |
| Command wrong format | 1 | 1 | 0 |
| Command byte number invalid | | | |
| Format error in node logic | 1 | 1 | 1 |
| Any error relating to the payload length in the TX or RX FIFO, either writing/reading too much or too little data. | | | |
| Packet transmit blocked by firewall | | | |

The system 10 includes a passive listener mode. A node may be placed in passive listener mode, which causes the node to act like a combination of a node and an application (even though the application has not been developed), and allows testing of a node and application under development with virtual nodes/applications. In this mode, the node still loads and transmits packets 26 according to the protocol. However, the receive FIFO is bypassed in this mode and the data received by the node 16 is streamed out to the top level for immediate access by the application (e.g., a monitoring application). Each byte of data can be presented to the application along with a strobe indicating the byte is valid. It is up to the application to store or act upon the data immediately as it is not stored in the node, and the output is overwritten by the next byte of data. The passive listener can take on an array of all the addresses in the system 10 that it can mimic.

The data received by the node can be sent out to the application before error checking is completed, so it is up to the tester to monitor the error lines and to handle the clearing of any data the application may have stored if an error is indicated. Additionally, the application may indicate an array of addresses in PL_node_address (array) from which the listener node is to receive packets 26 that comprise one of these addresses as its destination address. This is different from the normal mode of operation where the node only receives packets 26 addressed to its own node address. This allows the application to be able to sniff packets 26 being sent to any node on the bus.

The application may specify a select set of addresses, or may set the PL_all_address input high indicating that packets 26 addressed to any address will be received by the passive listener. This allows the tester to configure the node to act as a bus monitor that listens to all, or to a select subset, of all traffic that is sent over the bus. If PL_all_address is set high, the passive listener will receive packets 26 addressed to any address, but it will only ACK to addresses contained in the PL_node_address array. In Passive Listener mode, after a destination application busy error occurs, the passive listener will output a byte of garbage data on the PL_Data line. This byte should be ignored by the application and not considered as the first byte of a new packet.

Figure 19:
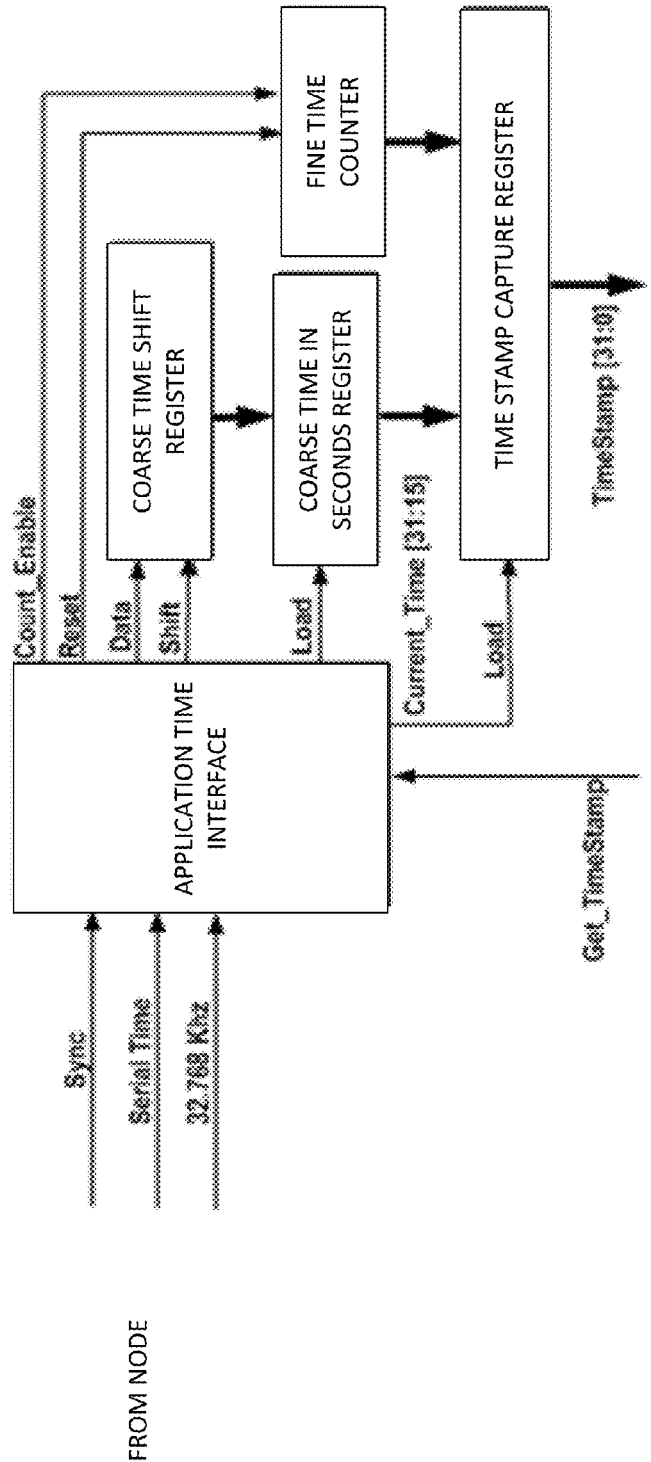
FIG. 19 depicts a schematic of exemplary time stamp logic.

The system 10 can optionally include a 3-wire time interface provided for use on either interface data ports. The time port allows the application 14 to generate a mirror (synchronized) copy of the nodes internal time stamp clock for time stamping acquired data in the built-in monitoring functions. Table 7 shows exemplary names and functions of the 3-wire signals, which can be used by an application to recreate the node time stamp according to FIG. 19. The serial time format is represented as FIG. 20. The top level of the node contains a 32 bit output port (FB_timestamp). This allows the application to be able to grab the timestamp directly without having to implement the logic shown in FIG. 21. This may be used if the application and the node reside in the same chip. If the application and node reside in separate chips, then it likely will not be feasible to port all 32 lines across. Instead, the 3-wire interface would be used.

TABLE 5

Optional 3-Wire Serial Time Interface Signals

| Signal Name | I/O Direction | Function |
|---|---|---|
| Sync | To Application | Used to reset slave fine time counter and load coarse time. 1 second period, 50% duty cycle |
| Serial_Time | To Application | Coarse time (seconds) serial data to slave time function |
| 32Khz_clock | To Application | Clock for sending coarse time and updating fine time |

A firewall interface is also provided. Objects from 0X7E00 to 0X7FFF are reserved for special functions (UQS processing). The two blocks of specified objects are firewall protected to prevent node hardware that does not process UQS data from containing objects at the same addresses. This can prevent nodes that do not need to store UQS events from receiving any packets 26 addressed to UQS objects. Packet processing stops as soon as the headers are decoded. The payload is never passed on to any internal storage element if the firewall is on.

The firewall can be two-way. It can prevent a node 16 from sending UQS objects or receiving UQS objects. When enabled, Firewall 1 can block addresses from 0X7E00 to 0X7EFF, and Firewall 2 can block objects from 0X7F00 to 0X7FFF. Having either enable line asserted for either of the firewalls will cause the associated firewall to be enabled. Having two enable lines for each firewall is a safety requirement to ensure that a single broken connection will not disable the firewall. While assertion of only one of the enable lines for each firewall will cause that firewall to be enabled, both enable lines should be set low to provide the maximum amount of protection. When a receiving node 16*b* detects that the packet 26 it is receiving has a destination object address that is prohibited by its firewall settings, it will "stop listening" to the bus and will not respond to back to the transmitting node 16*a* (no Header ACK will be sent).

The system 10 includes a CRC Generator. An algorithm is used for calculating both the header and payload CRC is based on the CRC-16-CCITT algorithm. This algorithm uses the following generating polynomial:

$$G(x)=x^{16}+x^{12}+x^5+1=(x+1)(x^{15}+x^{14}+x^{13}+x^{12}+x^4+x^3+x^2+x+1)$$

The CRC implementation uses a seed value of 0XFFFF. All of the registers used in this implementation are designed to revert to a value of 1 when reset, so the seed value is automatically contained in the registers upon reset. Next, the CRC data are shifted into the registers a bit at a time Error! Reference source not found. Once all the data have been shifted in, the resulting value left in the registers will be the CRC.

Figure 21:
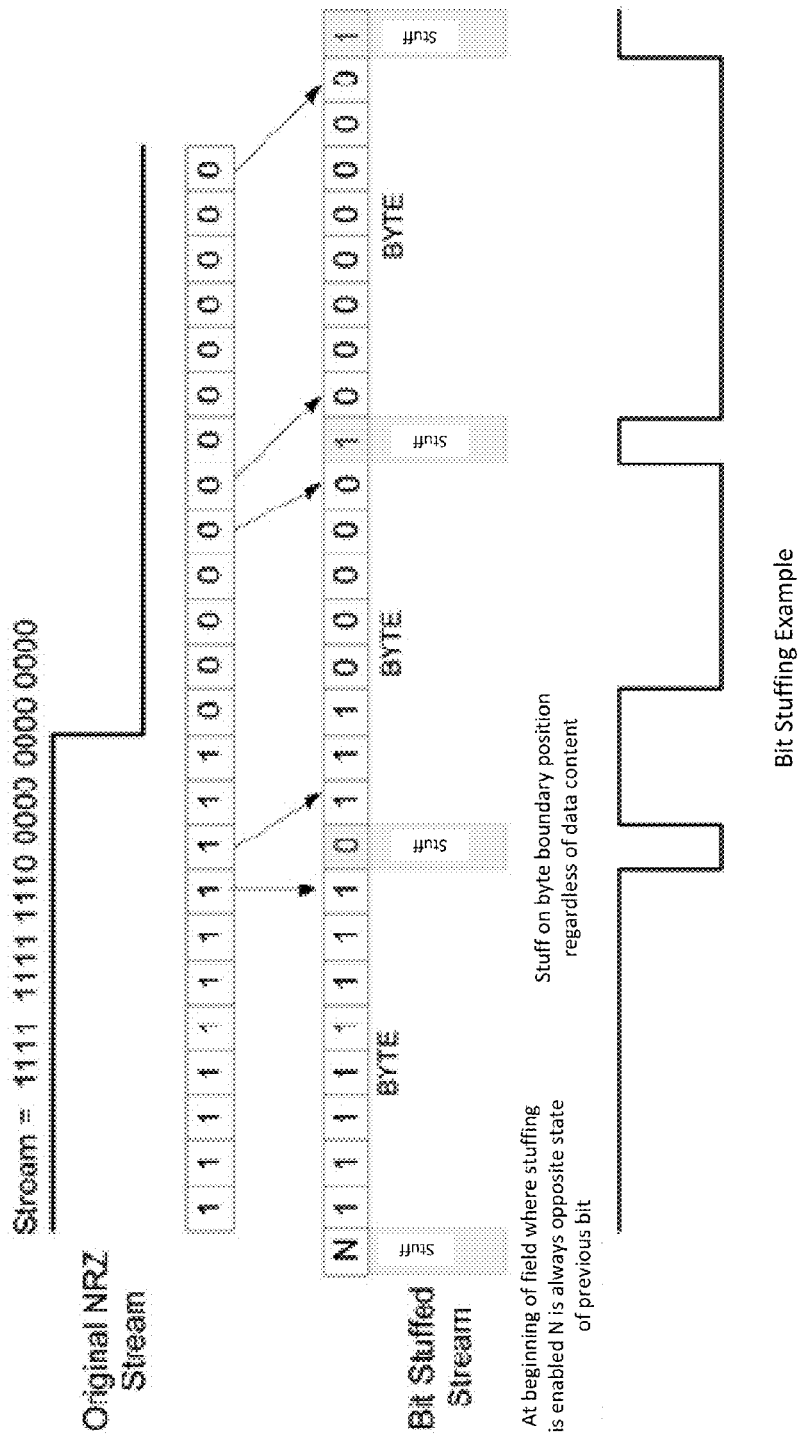
FIG. 21 depicts a schematic of a bit stuff example.
Figure 22:
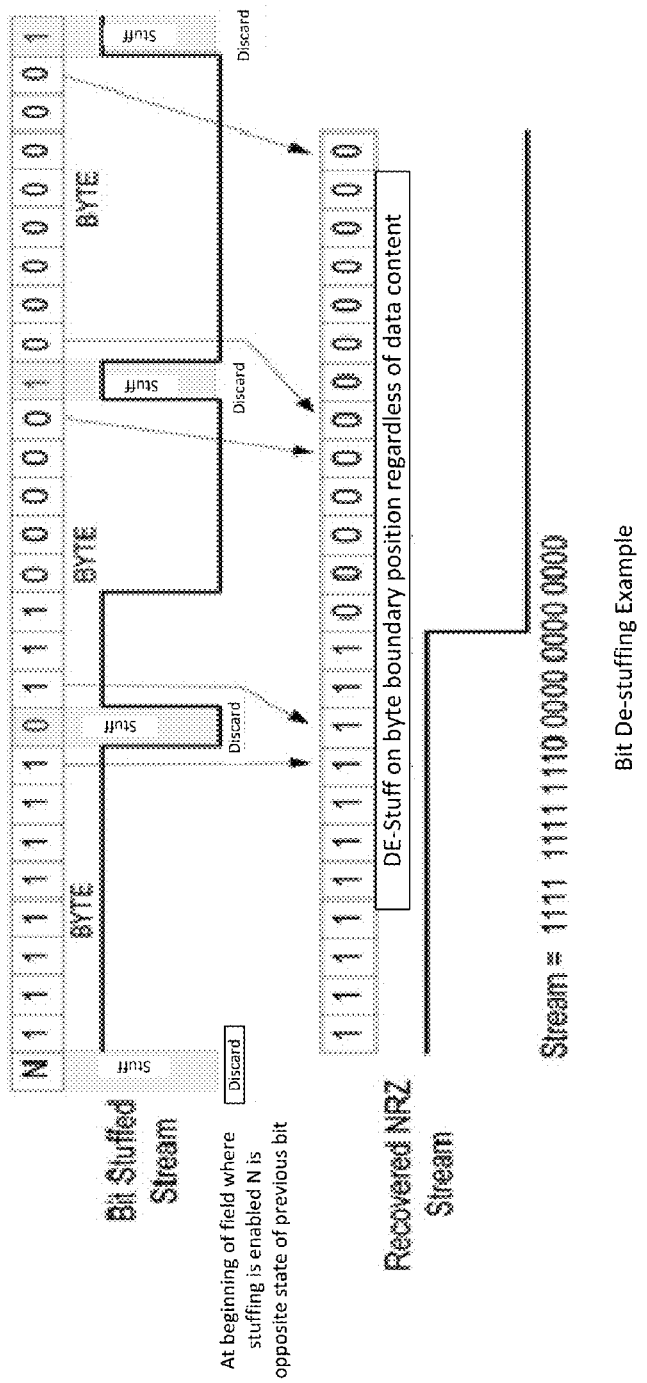
FIG. 22 depicts a schematic of a bit de-stuff example.

FIG. 21 Error! Reference source not found. illustrates a bit stuffing example. The bit stuffer starts at the module address field and inserts a bit (stuff bit) of the opposite value of the previous bit seen in the stream such that each byte is framed on both sides by a stuff bit, with only a single stuff bit between each payload byte. The Ack Busy and Guard fields are not bit stuffed. A bit stuff becomes part of the string and, therefore, its position in the stream is not stream data content dependent. The position of a stuff will always occupy the same position in the stream. FIG. 22 shows a bit de-stuffing example, which can be used by the receiving node 16.

The receiving node 16 can perform a check on the received CRCs (both header and payload) to check whether any errors occurred in the packet 26. The check is performed by recalculating the CRC using the same algorithm as described for the transmitter CRC. The same seed (0XFFFF) is loaded into the shift register implementation on reset. Next, the data that the CRC will be based upon is shifted into the registers a bit at a time. Once the data have been shifted in, then the transmitted CRC is also shifted in and the resulting value in the shift register checked against 0X0000. A resulting value of 0X0000 indicates that no errors occurred in the packet while a value other than 0X0000 indicates that an error did occur.

Figure 23:
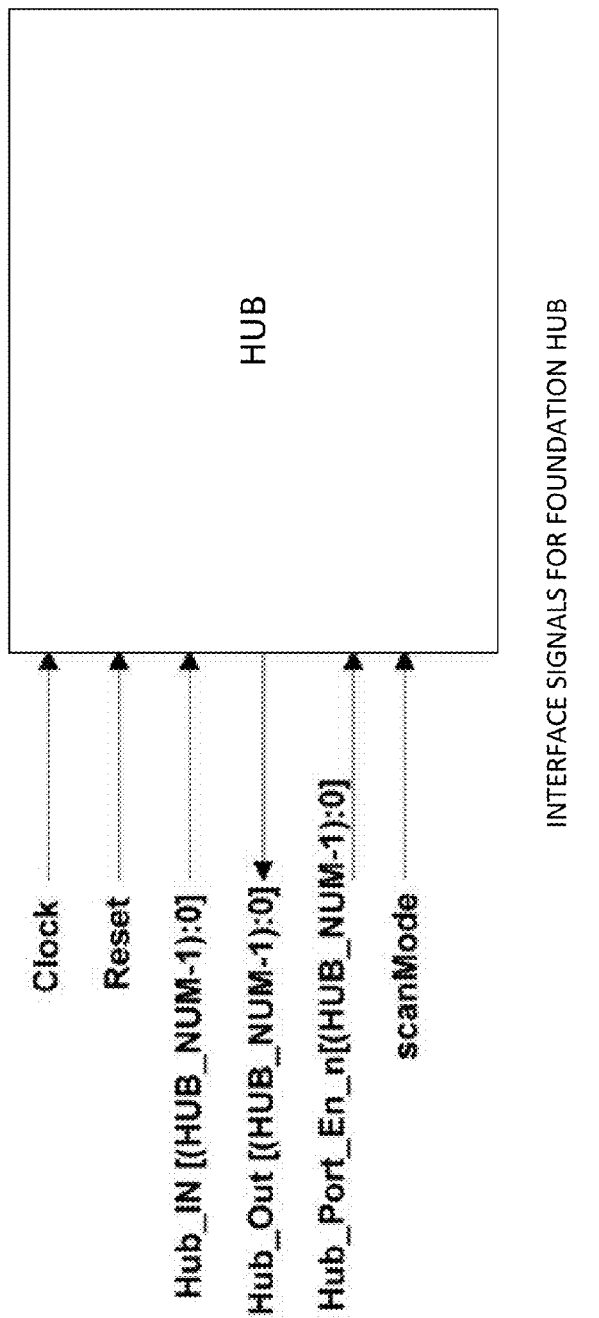
FIG. 23 depicts a schematic representation of interface signals.

FIG. 23 illustrates the interface signals associated with the hub 22. The width of the data lines and enable signal is determined by the number of nodes 16 desired to be connected to the hub 22 and is specified using HUB_NUM.

Figure 24:
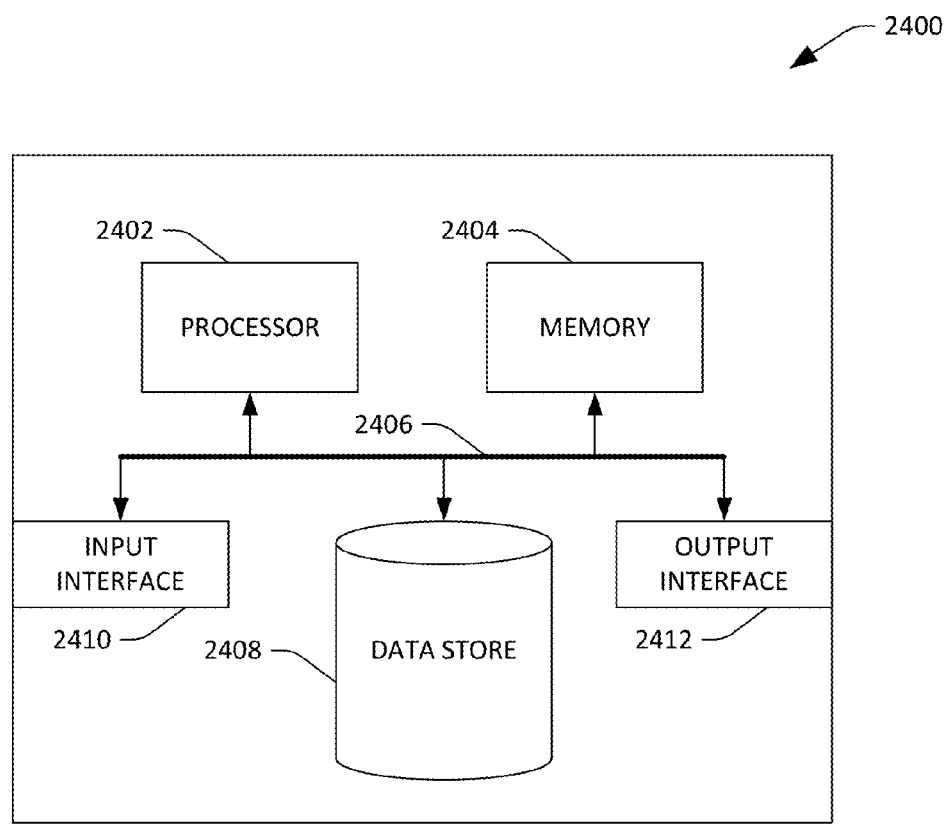
FIG. 24 illustrates an exemplary computing system.

Referring now to FIG. 24, a high-level illustration of an exemplary computing device 2400 that can be used in accordance with the systems and methodologies disclosed herein is illustrated. For instance, the computing device 2400 may be a device in the system 10. By way of another example, the computing device 2400 can be or be included in the hub 22. The computing device 2400 includes at least one processor 2402 that executes instructions that are stored in a memory 2404. The instructions may be, for instance, instructions for implementing functionality described as being carried out by one or more components discussed above or instructions for implementing one or more of the methods described above. The processor 2402 may access the memory 2404 by way of a system bus 2406. In addition to storing executable instructions, the memory 2404 may also store time stamps, protocol instructions, etc.

The computing device 2400 additionally includes a data store 2408 that is accessible by the processor 2402 by way of the system bus 2406. The data store 2408 may include executable instructions, time-stamps, etc. The computing device 2400 also includes an input interface 2410 that allows external devices to communicate with the computing device 2400. For instance, the input interface 2410 may be used to receive instructions from an external computer device, from a user, etc. The computing device 2400 also includes an output interface 2412 that interfaces the computing device 2400 with one or more external devices. For example, the computing device 2400 may display text, images, etc. by way of the output interface 2412.

Additionally, while illustrated as a single system, it is to be understood that the computing device 2400 may be a distributed system. Thus, for instance, several devices may be in communication by way of a network connection and may collectively perform tasks described as being performed by the computing device 2400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

APPENDIX

The protocol includes the following requirements, signals, and reports:

Interface:
Interface Reserved Addresses:
Addresses set aside for testing purposes.

B_0001 No node shall be assigned an address of 0X00 or 0XFF.

B_0002 Destination address 0X00 shall be reserved for global broadcasts which shall be received by all nodes attached to the system 10 regardless of each nodes assigned address.

B_0003 Destination address 0XFF shall be reserved for a blind broadcast to the bus monitor.

B_0004 Broadcasts to 0XFF shall not be received by any node. Only the bus monitor and passive listener are allowed to receive packets 26 from this address.

Interface Commands:
Indicate to the node what type of action to take. Valid for both parallel and SPI mode.

B_0005 If an error is indicated by the node while the application is performing a node command, the node shall continue to respond back to the application as appropriate (i.e., Command_Complete) to prevent the application from getting stuck. If the application implements a bi-direct on the User_In and User_Out ports in order to combine them into a bi-direct bus using User_OE to switch directions on the bi-direct port, and the node is being operated in parallel mode, the application should take extra precautions to prevent contentions on the application lines. In the Read RX Buffer and Read Error Code commands, the User_In line should be tri-stated as soon as User_Strobe is de-asserted following the command byte. This will ensure that User_In is not still being driven when the node begins to drive the output on User_Out.

Write TX Buffer: 0x10:
Data transfer across the bus.

B_0006 The Write TX Buffer command shall indicate the beginning of loading a packet into the transmit buffer.

B_0007 If the Write TX Buffer command is issued while the still TX Buffer still contains the data from a previous Write TX Buffer command, then the TX Buffer FIFO pointers are reset and the new data overwrites the existing packet stored in the FIFO.

B_0008 The Write TX Buffer command shall cause the node to return an error if User_Active/Slave_Select is de-asserted any time before the full amount of packet information has been written in, or if the application attempts to write in extra payload bytes beyond what was specified by the packet length that was written in the header portion of the packet.

B_0009 The Write TX Buffer command shall cause the node to return the status of the transfer on Error_Code(2:0) as soon as an error state is detected.

Transfer TX Buffer: 0x01:
Data transfer across the bus.

B_0010 The Transfer TX Buffer command shall cause the node to request the bus and transmit the packet upon gaining access to the bus.

B_0011 The node shall make repeated requests for the bus for up to 10 ms and will then timeout if it has not successfully gained access and send an error code to the application (see Table 6).

B_0012 The Transfer TX Buffer command shall cause the node to return the status of the transfer on Error_Code(2:0) when an error state is detected (see Table 6).

Read RX Buffer: 0x20:
Sending data across the bus.

B_0013 In parallel mode, the RX_Buffer_Ready line shall go low at the same time as the assertion of Command_Complete for the last byte of data.

B_0014 In SPI mode, the RX_Buffer_Ready line shall go low during the reading of the second to last byte (first CRC byte), and is guaranteed to be low when the last byte is read-out, the application shall continue to read the current byte and then read one additional byte (second CRC byte) to correctly read all data from the receive FIFO.

B_0015 In SPI mode, the SDO data shall be valid on the rising edge of SCLK when reading bits from the node.

B_0016 The Read RX Buffer command shall allow a packet to be read from the Foundation receiver buffer when RX_Buffer_Ready has indicated that an error free packet is ready for the application.

B_0017 If the Read RX Buffer command is issued when RX_Buffer_Ready does not indicate a valid packet is available and the application attempts to strobe out data, then a Command_Complete will be issued by the node and an error code (110 or 111) will be indicated on the Error_Code lines on the rising edge of Command_Complete.

B_0018 De-asserting User_Active/Slave_Select after sending the read command and before any data are read out shall cause the FIFO pointers for the receive buffer to be reset, the RX_Buffer_Ready line to be de-asserted, and no error shall be reported.

B_0019 De-asserting User_Active/Slave_Select after some, but not all, of the packet data have been read out shall cause the FIFO pointers for the receive buffer to be reset, the RX_Buffer Ready line to be de-asserted, and an error (111) to be reported on the error lines when User_Active/Slave_Select is de-asserted.

B_0020 If the application continues a read command after RX_Buffer_Ready is de-asserted by the node, an error shall be indicated on the Error_Code lines when the first extra byte is written in.

Read Error Code—0x30:
See FIGS. 17 and 18.

Node Generics:
Reset_Active:

B_0021 This generic sets the logic level (0 or 1) that Reset must have to reset the node.

Reset_Sync_Bypass:

B_0022 A logical value of 0 on this generic will cause the reset sent into the node to be synchronized with the clock, while a value of 1 will bypass the synchronization register.

Platform_Target_Type:

B_0023 The application may select one of the following values for this generic to select the type of FIFOs memories specific to the platform being targeted: (ASIC, SPARTAN_3e, SPARTAN_6, VIRTEX_5, VIRTEX_4, PROASIC_3e, PROASIC_3, FUSION, IGLOO, GENERIC_TYPE).

Address_Num:

B_0024 When in passive listener mode, this integer generic allows the application to select the number of node addresses that the application wants to have the passive listener listen to and handshake with.

Enable_Delay:

B_0025 MDL test value, leave as default.

Precharge_15:

B_0026 A MDL test value, leave as default.

Clkstretch_Delay:

B_0027 An MDL test value, leave as default.

Bypass_Sync_Reg:

B_0028 A logical value of 0 on this generic will cause the User_Active and User_Strobe signals to be synchronized with the clock, while a value of 1 will bypass the synchronization registers.

B_0028a In any implementation of the Foundation Node (SPI or parallel mode), synchronizing registers must be used on User_Active (doubles as Slave_Select in SPI mode) and User_Strobe (doubles as SCLK in SPI mode). If Bypass_Sync_Reg is set to a value of 1, then the application must implement the sync registers at the top level.

General Node Inputs:

Int_Clk_Mon:

B_0029 This signal shall output a copy of the 50 MHz node clock allowing the application to be able to monitor the clock externally.

RX_LVDS_En:

B_0030 This signal shall mirror the value provided by LVDS_En.

TX_LVDS_En:

B_0031 This signal shall mirror the value provided by LVDS_En.

User_OE(7 downto 0):

B_0032 This bus shall indicate when the value on User_Out is being driven. Each bit of User_OE corresponds to the same bit of User_Out.

Power_Detect_n:

B_0033 This signal allows an external application interface application to tell the node when the application is powered up.

XXXXXX_en:

B_0034 Any other signal with _en appended to the end shall be asserted when Power_Detect_n is asserted, and shall be de-asserted when Power_Detect_n is not asserted.

FB_timestamp:

B_0034a This signal provides the internal node timestamp which may be grabbed directly by the application.

FB_version:

B_0034b This signal provides the current version of the node to the application for version tracking purposes. The upper 4 bits indicate the version number, while the lower 4 bits indicate the version sub-number (i.e., X72=Version 7.2).

Parallel Mode Function Specific Inputs:

B_0035 The following inputs shall have a specific function pertaining to the Interface when in parallel mode: User_Active; User_Strobe; User_In(7:0)(MSB:LSB); and Module_Address(7:0).

User_Active:

Signal indicates the start and end of an application command.

B_0036 In parallel mode the User Active signal shall be asserted high to indicate that a command is being sent to the node.

B_0037 In parallel mode once asserted, the User Active signal shall stay asserted until the command has been completed.

B_0038 In parallel mode once asserted, if the User Active signal is de-asserted before the command has been completed, the node shall abort the command and return to the initial state regardless of any activity on the other interface inputs. Any partially read, loaded, or transmitted packet will be discarded by both the transmitting and receiving nodes (when applicable) and an error code shall be indicated if any of the error code conditions were violated.

User_Strobe:

Signal indicates when application is writing data to a node and when application is reading data from the node.

B_0039 In parallel mode the User Strobe signal shall be asserted to indicate that the current byte transfer (writing data or a command into the node, or reading data out of the node) has been started.

B_0040 In parallel mode the User Strobe signal shall be de-asserted in response to Command_Complete asserting to indicate that the application has accepted a byte when the application is reading data from the node.

B_0041 In parallel mode once the User Strobe signal has been asserted, it should remain asserted until Command_Complete asserts, and shall then de-assert.

User_In (7:0):

Signal used as an input into the foundation node to transfer commands and data into the node.

B_0042 When the User In signal has a valid value to be written to the node, indicated by User_Strobe being asserted by the application, this signals value shall not change until the falling edge of Command_Complete.

Module_Address (7:0):

Signal used to set the address of the node.

B_0043 The value of the Module Address signal shall be stable for startup/reset of the node, and shall not be dynamically changed during node operation in specified applications.

B_0044 The module address shall not be set with a value of 0X00 since this address is reserved to indicate a global broadcast to all nodes.

B_0045 The module address shall not be set with a value of 0XFF since this address is reserved to indicate a broadcast to the bus monitor.

Parallel Mode Function Specific Outputs:

B_0046 The following outputs shall have a specific function pertaining to the Interface when in parallel mode: Command_Complete; and User_Out(7:0).

Command_Complete:

Signal indicates that node has accepted byte placed on User_In when writing data to the node, that value of User_Out is valid when reading data from the node, and that transmission of packet across the bus has been completed.

B_0047 In parallel mode, the Command Complete signal shall be asserted to indicated that a byte has been successfully written to the node by the application.

B_0048 In parallel mode the Command Complete signal shall be asserted to indicate that a read byte is valid for the application to read.

B_0049 This signal shall be asserted when a send packet across bus command is complete.

B_0050 Once asserted, the Command Complete signal shall be de-asserted only when one of the following conditions is met: User_Active has been de-asserted. User_Strobe has been de-asserted. The node has been reset in hardware.

User_Out (7:0):

Signal used to receive data bytes from the node when reading a packet from a receiver.

B_0051 The User Out signal data are the contents of the RX Buffer.

B_0052 Once Command_Complete has been asserted during a read from the node, the User_Out signal shall remain stable until the next falling edge of Command Complete.

SPI Mode Function Specific Inputs:

Interface signals shown in Tables 4 and 5 used to drive the input/output and clock lines.

B_0053 The following inputs shall have a specific function pertaining to the User Interface when in SPI mode: User_Active-Slave_Select; User_Strobe-SCLK; and User_In(0)-SDI.

User_Active-Slave_Select:

Signal used to indicate when the application wants to communicate to the SPI device, active low.

B_0054 The Slave Select signal shall be asserted low to indicate to the SPI slave (node) that a transfer between the node and application via SPI is in progress.

B_0055 The Slave Select signal shall stay asserted low during entire transfer, even if the transfer is paused; i.e., the SCLK is suspended.

B_0056 The Slave Select signal shall be set high to indicate the end of a transfer cycle.

User_Strobe-SCLK:

Clock signal supplied by the application upon which serial data transfer is clocked.

B_0057 In SPI mode the User Strobe signal must have signal integrity associated with a clock and must remain clean and glitch-free.

B_0058 In SPI mode if the User Strobe signal is stopped in the midst of a transfer, the transfer must be paused.

B_0059 In SPI mode the User Strobe signal shall have a maximum frequency of 6 MHz, and a minimum frequency of 10 Hz.

User_In (0)-SDI:

Signal used to supply serial data input to the SPI slave (node).

B_0060 The User_In (0) signal must be stable for one period of SCLK to ensure it is read correctly.

B_0061 When transmitting data, the value on the User_In (0) signal must be asserted by the SPI master on the falling edge of SCLK, SDI is read on the rising edge of SCLK.

SPI Mode Function Specific Outputs:

B_0062 The following outputs shall have a specific function pertaining to the User Interface when in SPI mode: Command_Complete; and User_Out (1)-SDO.

Command_Complete:

In SPI mode, this output signal only indicates that request to send packet command has completed.

B_0063 In SPI mode the Command_Complete signal shall only be asserted high to indicate that the Transmit TX Buffer command has completed and the Error code indicates the completion status.

B_0064 In SPI mode once asserted, this signal shall not be de-asserted until Slave_Select has been set high (ending the communication with the SPI slave [node]).

User_Out(1)-SDO:

Signal used to receive serial output from the SPI slave (node).

B_0065 The SDO signal is presented on the falling edge of SCLK and is guaranteed stable for sampling by the application on the rising edge of SCLK.

Interface Input Common to Parallel/SPI Modes:

Same function regardless of whether it is in parallel mode or SPI mode.

B_0066 The following input shall have the same function pertaining to the Interface in both parallel mode and SPI mode: SPI_En SPI_En:

Signal used to select whether node is in parallel or SPI mode.

B_0067 A logical value of zero on the SPI_En bit shall cause the node to function in parallel mode.

B_0068 A logical value of one on the SPI_En bit shall cause the node to function in SPI mode.

B_0069 The value of the SPI_En signal shall be set upon startup/reset of the node, and shall not be dynamically changed during node operation.

Interface Outputs Common to Parallel/SPI Modes:

Same function regardless of whether in parallel or SPI mode.

B_0070 The following outputs shall have the same function pertaining to the Interface in both parallel mode and SPI mode: RX_Buffer_Ready; and Error_Code(2:0).

RX_Buffer_Ready:

Signal acts as a status line to indicate that an error free packet is ready for the application to read from the receive buffer.

B_0071 The RX Buffer Ready signal shall be asserted when the bus node has an error-free packet ready for the application.

B_0072 Once asserted, the RX Buffer Ready signal shall be de-asserted if the application reads all the data from the receive buffer.

B_0073 Once asserted, the RX Buffer Ready signal shall be de-asserted if the application ends a read command while there is still data in the receive buffer and the FIFO pointers shall be reset.

B_0074 Once asserted, the RX Buffer Ready signal shall be de-asserted if the application resets the node by hardware reset.

Error_Code (2:0):

Signal can provide an error code supplied by the node, indicating either successful transfer, or indicating what type of error occurred, as presented in Table 6.

B_0075 The Error Code signal shall indicate the status of the current bus transfer using the following codes:

B_0075a When an error code appears on the Error_Code lines, it will stay valid until the end of the next command byte where it will be reset to "000".

B_0075b When a Read Error Code command is sent, the Error_Code lines will not be reset at the end of the command byte and the error code will be passed out on the User_Out(2 downto 0) lines.

Error_Code: 000:

B_0076 The Error_Code signal shall have a value of 000 if no error has been detected.

Error_Code: 001:

B_0077 The Error_Code signal shall have a value of 001 if the receiving node does not acknowledge the header data during a transmit packet command.

Error_Code: 010:

B_0078 The Error_Code signal shall have a value of 010 if the node the packet being sent to (destination node) is busy when a0 transmit packet command is issued.

Error_Code: 011:

B_0079 The Error_Code signal shall have a value of 011 if the receiving node does not acknowledge the payload data during a transmit packet command.

Error_Code: 100:

B_0080 The Error_Code signal shall have a value of 100 if the watchdog timer reaches 10 ms (+/−1 us), starting from when the transmit command 0x01 was sent (on assertion of User_Strobe for command 0x01), and the transmitting node has not yet won arbitration (likely due to a disconnected cable, disabled hub port, or too much traffic on the bus from higher priority applications).

Error_Code: 101:

B_0081 The Error_Code signal shall have a value of 101 if the transmit buffer is empty when a Transmit TX Buffer command is issued.

Error_Code: 110:

B_0082 The Error_Code signal shall have a value of 110 if an undefined command is issued.

Error_Code: 111:

B_0083 Not used

B_0084 The Error_Code signal shall have a value of 111 if either of the nuclear safety firewalls are enabled, and a load packet command is issued with the packet containing an destination object address in the range of objects blocked by the active nuclear safety firewall. The error code will appear as soon as the node detects that the destination object address is in an enabled firewall range.

B_0085 The Error_Code signal shall have a value of 111 if the number of bytes loaded into the transmit FIFO does not match the packet length field.

B_0086 The Error_Code signal shall have a value of 111 if the application reads at least one byte from the node, but terminates the command (de-asserts User_Active/Slave_Select) before all the data has been read from the receive FIFO.

B_0087 The Error_Code signal will have a value of either 111 or 110 if the application attempts to read from the receive FIFO once the FIFO is empty.

Bus Interface:

Bus Interface Inputs:

B_0088 The following inputs shall be used at the Bus Interface: RX_Bus_In (LVDS); CMOS_RX_Bus_In; and LVDS_En.

RX_Bus_In (LVDS):

Signal provides serial input from the hub into the node when the LVDS are enabled.

B_0089

CMOS_RX_Bus_In:

Signal can provide serial input from hub into the node when the LVDS are disabled.

LVDS_En:

Signal can allow the application to choose between enabling the LVDS ports as the outputs, or bypassing the LVDS if desired.

B_0090 A value of logic zero on the LVDS En line shall cause the LVDS outputs to be bypassed.

B_0091 A value of logic one on the LVDS En line shall cause the LVDS outputs to be enabled.

Bus Interface Output:

B_0092 The following outputs shall be used at the Bus Interface: TX_Bus_Drive (LVDS); and CMOS_TX_Bus_Drive.

TX_Bus_Drive (LVDS):

Signal can provide the serial output from the node into the hub when the LVDS are enabled.

B-0093

CMOS_TX_Bus_Drive:

Signal provides serial output from the node into the hub when the LVDS are disabled.

Cable Length Requirement:

B_0094 The maximum delay associated with cables/connectors allowed between any two nodes via a hub is TBD ns, for flex and twisted pair cable.

Passive Listener Mode:

In passive listener mode, after a destination app busy error occurs, passive listener will output a byte of garbage data on the PL_Data Line. This byte should be ignored by the application and not considered as the first byte of a new packet.

B_0095 When in passive listener mode, all the interface commands shall operate as normal except for the Read RX Buffer command.

B_0096 When in passive listener mode, if the Read RX Buffer command (0x20) is issued, the node shall show an error code of either 110 or 111 indicating an invalid command due to an empty RX FIFO.

Passive Listener Specific Inputs:

B_0097 The following inputs are used in passive listener mode: PL_en; PL_all_address; and PL_node_address (array).

PL_en:

B_0098 A logical value of zero on the PL_en bit shall cause the node to function in the normal mode.

B_0099 A logical value of one on the PL_en bit shall cause the node to function in passive listener mode.

PL_all_address:

B_0100 A logical value of zero on the PL_all_address bit shall cause the node to only receive packets whose destination address is in the PL_node address array.

B_0101 A logical value of one on the PL_all_address bit shall cause the node to receive all packets regardless of their destination node address.

PL_node_address (array):

B_0102 If PL_all_address bit has a logical value of zero, this array shall contain all the byte address values that the application wants the passive listener to receive packets from. If the PL_all_address bit has a logical value of one, the passive listener will receive all packets, but will only ACK to packets with a destination address in this array.

Passive Listener Specific Outputs:

B_0103 The following outputs are used in passive listener mode: PL_Valid; and PL_Data.

PL_Valid:

B_0104 This bit shall strobe high for one clock cycle to indicate that the next byte output is valid on PL_Data.

PL_Data:

B_0105a This byte output signal shall provide the full decoded packet bytes from any packet addressed to the module address of this node regardless of the value assigned to PL_en. If Pl_en is assigned a value of zero the packet will still be stored in the RX FIFO and will still need to be read or cleared by the application.

B_0105 When PL_en is assigned a logical value of zero (operating as a normal node), this byte output shall provide only the source address and destination address of packets that are not addressed to the module address of the node.

B_0105b When PL_en is assigned a logical value of one (operating in passive listener mode), this byte output shall always provide the source and destination address of any packet sent over the bus. Additionally, if PL_all_address is high, or PL_all_address is low but the destination address is contained in the PL_node_address array then the remaining packet bytes will also be sent out on PL_Data following the source and destination address.

Figure 20:
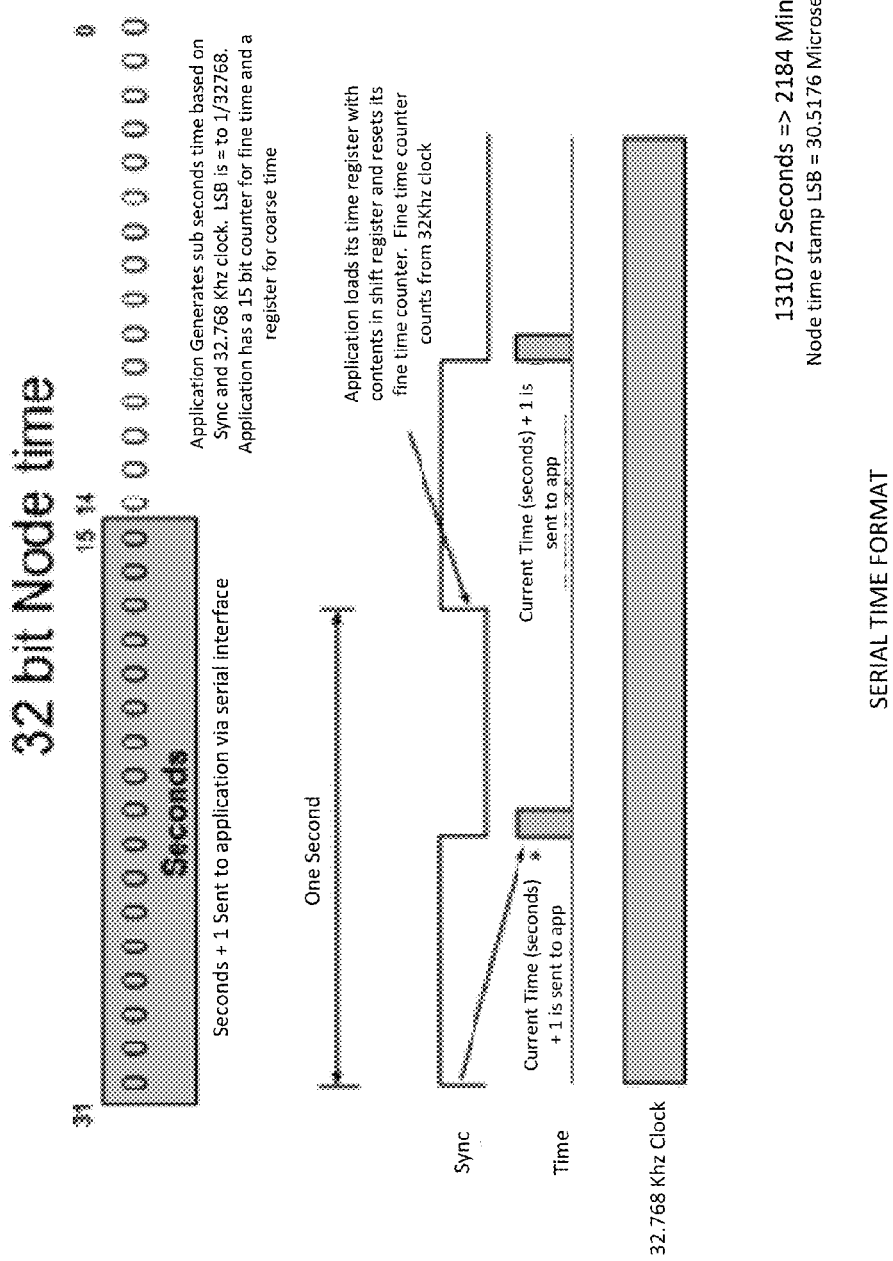
FIG. 20 depicts a schematic of an exemplary serial time format.

3-Wire Time Interface:

Optional. Provided for use of either interface data ports. Table 7 shows the name and function of the 3-wire signals, which can be used by the application to recreate the node time stamp according to FIG. 19. Serial time format is represented in FIG. 20.

3-Wire Time Interface Outputs:

B_0106 The following inputs shall be used at the Bus Interface: Serial_Time_Clock; Serial_Time_Data; and Serial_Time_Sync Serial_Time_Clock:

Signal is a 32.768 KHz clock sent out from the node from which sub seconds timestamp is generated.

B_0107 The Serial Time Clock signal shall be a 32.768 KHz clock.

Serial_Time_Data:

Serial time output data line that provides the timestamp value from the node.

B_0108 The time stamp data shall be clocked out on the Serial Time Data signal immediately following the falling edge of Serial_Time_Sync.

Serial_Time_Sync:

Signal is a square wave with a one second period. Falling edge of signal indicates that the current time is being transmitted to the application.

B_0109 The Serial Time Sync signal shall be a square wave with a 1-second period.

B_0110 Each falling edge of the Serial Time Sync signal shall indicate the start of the current time stamp being clocked out on Serial_Time_Data.

Firewall Interface:

B_0111a Global broadcasted packets (destination address of 0X00) and blind broadcast packets (destination address of 0XFF) with an destination object address in the range of either firewall (0X7E00-0X7EFF) will be blocked regardless of the firewall settings and will generate an error when the packet is attempted to be loaded into the node.

When a receiving node detects that the packet it is receiving has a destination object address that is prohibited by its firewall settings, it will 'stop listening' to the Foundation bus and will not respond back to the transmitting node (no Header Ack will be sent).

Firewall Inputs:

B_0111 The following inputs shall be used at the Bus Interface:

Firewall_1_En_Pin_1_n; Firewall_1_En_Pin_2_n; Firewall_2_En_Pin_1_n; and Firewall_2_En_Pin_2_n.

Firewall_1_En_Pin_1_n:

Signal is the first enable line for firewall 1.

B_0112 When the Firewall 1 En Pin 1 signal is asserted low, then Firewall 1 shall be enabled and the node shall be blocked from transmitting or receiving any packets that contain an application object in the range 0X7E00-0X7EFF.

Firewall_1_En_Pin_2_n:

Signal is the second enable line for firewall 1.

B_0113 When the Firewall 1 En Pin 2 signal is asserted low, then Firewall 1 shall be enabled and the node shall be blocked from transmitting or receiving any packets that contain an application object in the range 0X7E00-0X7EFF.

Firewall_2_En_Pin_1_n:

Signal is the first enable line for firewall 2.

B_0114 When the Firewall 2 En Pin 1 signal is asserted low, then Firewall 2 shall be enabled and the node shall be blocked from transmitting or receiving any packets that contain an application object in the range 0X7F00-0X7FFF.

Firewall_2_En_Pin_2_n:

Signal is the second enable line for firewall 2.

B_0115 When the Firewall 2 En Pin 2 signal is asserted low, then Firewall 2 shall be enabled and the node shall be blocked from transmitting or receiving any packets that contain a user object in the range 0X7F00-0X7FFF.

Foundation Node—Transmitter:

Foundation Transmit FIFO:

B_0116 If an error occurs during a node command, indicated by Error_Code, the transmit FIFO pointers shall be reset.

CRC Generator:

B_0117 The CRC generation shall take place prior to bit stuffing on Node transmit.

B_0118 The CRC generation shall take place post bit de-stuffing on Node receive.

Header CRC Requirements:

B_0119 The generation of the header CRC shall not include the Start-of-Frame (SOF) bit in the header CRC calculation.

B_0120 The generation of the header CRC shall start the header CRC calculation with the first bit of the source module field.

B_0121 The generation of the header CRC shall pause after including the last bit of the source field module.

B_0122 The generation of the header CRC shall not include the 3-bit re-sync field in the header CRC calculation but will resume on the first bit of the destination module field.

B_0123 The generation of the header CRC shall conclude the header CRC calculation with the last bit of the payload length field.

Payload CRC Requirements:

B_0124 The generation of the payload CRC shall start the payload CRC calculation with the first bit of the payload field.

B_0125 The generation of the payload CRC shall end with the last bit of the payload field.

Bit Stuffing:

FIG. 22 illustrates a bit stuffing example.

B_0126 The bit stuffer shall search byte boundaries in the appropriate Foundation packet fields and insert a bit (stuff bit) of the opposite value of the bit that comes immediately before the stuff bit.

A bit stuff becomes part of the string and, therefore, its position in the stream is not stream data content dependent. The position of a stuff will always occupy the same position in the stream.

B_0127 Bit stuffing shall be disabled during arbitration.

B_0128 Bit stuffing shall not start until the destination module field.

B_0129 Bit stuffing shall stop after a bit has been inserted after the last bit of the header CRC and resume at the first bit of the payload field and then end after the last bit of the payload CRC field.

B_0130 Bit stuffing shall not include the header ACK, Re-Sync, Guard and application busy fields.

Bus Arbitration:

B_0131a A node will only drive the bus dominant in an attempt to gain access to the bus if it has not already seen the bus driven dominant by another node. Once it has seen another node drive the bus dominant it will not attempt to gain access to the bus until it has seen the bus go idle again.

B_0131 If two or more nodes each drive the bus dominant at close to the same time in an attempt to gain access to the bus, and neither had yet seen the other drive the bus before making the decision request the bus (i.e. multiple nodes requesting access to an idle bus at nearly the same time), then the node with the lowest address must always win arbitration and gain access to the bus.

B_0132 If a node loses arbitration, its node arbiter must continue processing to determine if the winning node is addressing a packet to the node even if the transmitter is holding off until the bus is free.

B_0133 If a node loses arbitration, shall have a 10 ms (+/−1 us) window (timed from the assertion of User_Strobe on the command byte 0x01) to continue requesting the bus; failure to gain access to the bus in this 10 ms (+/−1 us) window shall cause the node to generate an error on Error_Code (2:0) (See Table 6).

Foundation Node—Receiver:

Bit De-stuffing:

FIG. 22 is a bit de-stuffing example.

B_0134 During bit destuffing, when byte boundaries occur, the ninth bit shall have the opposite value of the previous bit seen in the stream, indicating that it is a stuff bit. The ninth bit gets discarded by the receiver. Encoding and decoding is done so that the data to the CRC check never gets shifted in position, as the receiver always knows the position of the stuff bits. This method of stuffing may also be referred to as fixed framing.

B_0135 When the stuff-bit position is detected, and this bit is not the opposite value of the previous bit, this detected bit stuff (or frame) error shall cause the Foundation receiver to destroy any temporary data and not acknowledge the packet.

CRC_Calc:

Data that CRC is based upon is shifted into the registers a bit at a time. Once shifted, the transmitted CRC is shifted in.

B_0136 Both header and packet CRCs shall be calculated in an identical manner to the way the transmitter CRCs were calculated, with the exception that the transmitted CRCs be included at the end of the calculation and the resulting CRC checked against 0X0000.

B_0137 Any CRC result obtained by the receiver CRC check that is not equal to 0x0000 shall result in an error being indicated, and the packet shall not be acknowledged by the receiver.

Foundation Hub Requirements:

Foundation Hub:

FIG. 24 illustrates interface signals associated with the foundation hub. The width of the data lines and enable signal is determined by the number of nodes desired to be connected to the hub.

Foundation Hub Interface Inputs:

B_0138 The following inputs shall be used at the Foundation Hub interface: Hub_In [(HUB_NUM-1):0]; and Hub_Port_En_n [(HUB_NUM-1):0].

Hub_In [(HUB_NUM-1):0]:

Signal supplies data being transmitted from a node to the hub.

Hub_Port_En_n [(HUB_NUM-1):0]:

Signal is active low and is used to enabled/disabled the desired ports.

B_0139 A logical value of one on any bit of the Hub Port En signal shall disable the corresponding hub port.

B_0140 A logical value of zero on any bit of the Hub Port En signal shall enable the corresponding hub port.

Foundation Hub Interface Outputs:

B_0141 The following output shall be used at the Foundation Hub interface:

Hub Out [(HUB_NUM-1):0]:

Signal supplies data being transmitted from the hub to a node.

Disable All Unused Hub Ports:

B_0142 Hub ports connected to unpowered devices shall be disabled.

Hub Port Kickoff Conditions:

B_0143 If the hub detects that the input to a port has been driven dominant continuously for 2.17 us (+/−0.05 us), the hub shall disable the hub port.

B_0144 If the hub detects a period of hub port activity (toggling between dominant and recessive) of 600.06 us (+/−50.0 us) without the port input being driven recessive for more than 2.17 us (+/−0.05 us), then the hub shall disable the hub port.

B_0145 A port that has been disabled by the hub shall remain disabled until the hub port receive line has been driven recessive for at least 2.17 us (+/−0.05 us). An additional delay is added on so that a total delay of 550.04 us (+/−50 us), from the start of the 2.17 us (+/−0.05 us) of recessive, is seen. Once this delay is passed, and if no hub kickoff conditions were met during this delay period, the hub port shall be re-enabled immediately if the hub has seen 2.17 us (+/−0.05 us) of idle on the bus, or (if another node is currently on the bus) as soon as 2.17 us (+/−0.05 us) of idle is seen on the bus.

Sub-Hub Connection Requirements:

B_0146 The maximum amount of sub hubs allowed to be connected in series is still to be determined (TBD).

B_0147 The maximum delay allowed through a sub hub (connector port to connector port) is still TBD, in nanoseconds (ns).

Foundation Clocking Requirements:

B_0148 The application shall supply a clock with a parts per million accuracy (PPM) value in the range of 0-50 PPM.

B_0149 The application shall supply a clock that is glitch (sliver) free.

Node Report Line Behaviors:

Node Debug Options:

B_0150 The following outputs can provide internal debug information about the node (their use is optional): Report_CRC_Error; Report_Module_not_Addressed; Report_NS_Safety_Block; Report_Packet_Accepted; Report_RX_Data; Report_RX_Data_Valid; Report_RX_Packet_Active; Report_Abort_RX_Active; Report_App_Busy_Error; Report_Illegal_Module_Address_Error; and Report_Stuff_Error.

Report_CRC_Error:

B_0151 This line shall provide a single clock cycle pulse at the end of either CRC field if a CRC error is detected.

Report_Module_not_Addressed:

B_0152 This line shall provide a single clock cycle pulse if the destination address of a packet being transmitted does not match the node address of the receiver.

Report_NS_Safety_Block:

B_0153 This line shall provide a 2 clock cycle wide pulse after the header portion of the packet if the receiver determines that the packet should be blocked by the firewall.

Report_Packet_Accepted:

B_0154 This line shall provide a single clock cycle pulse when the receiver has determined that an error free packet has been received.

Report_RX_Data_Valid:

B_0155 This line shall provide a single clock cycle pulse when the receiver has sampled a bit on its receive line.

Report_RX_Data:

B_0156 This line shall indicate the value of the bit sampled when a pulse on the Report_RX_Data_Valid line is seen. If using this report line sample on the falling edge of Report_RX_Data_Valid. This line will report bits in all fields (including ACK, APP_BUSY, GUARD, and EOF fields) with the only exception being the SOF field.

Report_RX_Packet_Active:

B_0157 This line shall go high on the $2^{nd}$ rising edge of the node clock following the falling edge of the start of the Start-of-Frame field, it shall remain high the $2^{nd}$ rising edge of the node clock following the falling edge of the final Report_RX_Data_Valid pulse.

Report_Abort_RX_Active:

B_0158 This line shall go high one clock cycle after the rising edge of any report line that indicates an error in the packet being received, it shall go low one clock cycle after the falling edge of Report_Packet_Active.

Report_App_Busy_Error:

B_0159 This line shall provide a single clock cycle pulse immediately after the acknowledge field if the receiver determines that part, or all, of a previous packet still resides in the receive FIFO.

Report_Illegal_Module_Address_Error:

B_0160 This line shall be asserted, and remain asserted, for as long as the node has been assigned an illegal module address (i.e. 0x00 or 0xFF).

Report_Stuff_Error:

B_0161 This line shall be asserted 2 clock cycles after the occurrence of a bit stuff error or when operating in Passive Listener mode and the PL does not provide a header ACK because the destination address was not found in the PL_node_address array; it shall remain asserted until 2 clock cycles after the de-assertion of Report_RX_Packet_Active, whereupon it will then be de-asserted.

Assertions pertaining to time have been stated with respect to a Clock_50 signal being a 50 MHz clock signal. This specification of clock frequency is a suitable value for most intended applications, but it is not a required value for operation of the Foundation Bus 20. For any other clock frequency value <fc> in MHz, the assertions stated in this document will be true if "50 MHz" is replaced everywhere by "<fc> MHz" and all stated time interval values are corrected to an actual time interval values by multiplication with the factor (50/<fc>).

What is claimed is:

1. A network system comprising:
    a transmitting node that transmits data at a first rate in accordance with a communications protocol, the transmitting node comprises a pin;
    a receiving node that receives the data and processes the data in accordance with the communications protocol; and
    a hub that is in communication with the transmitting node and the receiving node, the hub receives the data from the transmitting node and directs the data to the receiving node at the first data rate, wherein when the transmitting node has completed transmission of the data, the transmitting node initiates an arbitration procedure in accordance with the communications protocol and transmits a request to the hub at a second data rate, the second data rate being slower than the first data rate, the request being a request to transmit additional data, wherein the pin of the transmitting node is tied to ground to indicate that a third node in the network system is prohibited from receiving the data.

2. The network system of claim 1, wherein the first data rate is at least double the second data rate.

3. The network system of claim 1, the transmitting node and the receiving node being field programmable gate arrays that are configured to communicate with one another by way of the communications protocol.

4. The network system of claim 1, further comprising a first device that comprises the transmitting node and a second device that comprises the receiving node, the first device comprises a first application that generates the data transmitted by the transmitting node, the second device comprises a second application that consumes the data received by the receiving node.

5. The network system of claim 4, the transmitting node generates a first cyclic redundancy check (CRC) value based upon the data and transmits the first CRC value with the data to the receiving node.

6. The network system of claim 5, the receiving node receives the data and generates a second CRC value based upon the data, the receiving node, in accordance with the communications protocol, compares the first CRC value with the second CRC value.

7. The network system of claim 6, wherein the receiving node identifies that the first CRC value is equivalent to the second CRC value, and transmits an acknowledgement to the transmitting node responsive to identifying that the first CRC value is equivalent to the second CRC value.

8. The network system of claim 6, wherein the receiving node identifies that the first CRC value is different from the second CRC value and transmits an indication to the transmitting node that a packet that comprises the data has been rejected by the receiving node.

9. The network system of claim 1, further comprising a test module that is in communication with the hub, the test module monitors all network traffic that flows through the hub.

10. The network system of claim 1, wherein the transmitting node transmits an indication that the data is to be broadcast to all nodes in the network system.

11. A method executed by a node in a network system, the method comprising:
    receiving data generated by an application that is in communication with the node, the data is to be transmitted to a second node in the network system;
    responsive to receiving the data, generating a data packet in accordance with a communications protocol, the data packet comprises a header and a payload, the data included in the payload;
    responsive to receiving the data, initiating an arbitration process, wherein initiating the arbitration process comprises transmitting a request to a central hub at a first data rate;
    responsive to initiating the arbitration process, receiving confirmation from the hub that the node is able to transmit the data packet; and
    responsive to receiving the confirmation, transmitting the data packet at a second data rate, the second data rate being higher than the first data rate, wherein the node comprises a pin that is tied to ground to indicate that a third node in the network system is prohibited from receiving the data packet.

12. The method of claim 11, wherein the second data rate is at least double the first data rate.

13. The method of claim 11, wherein a difference between the first data rate and the second data rate is based upon lengths of cables in the network system.

14. The method of claim 11, wherein generating the data packet comprises:
    computing a cyclic redundancy check (CRC) value for the data; and
    including the cyclic redundancy check in the payload of the data packet.

15. The method of claim 11, the node being one of a field programmable gate array or an application specific integrated circuit that is configured to transmit and receive data in accordance with the protocol.

16. The method of claim 11, wherein the header of the data packet comprises data that identifies the second node and data that identifies an application of the second node that is to consume the data from the first node.

17. The method of claim 11, wherein the confirmation received from the hub comprises data that identifies the node.

18. A node in a network that is subjected to a harsh environment, the node configured to execute a protocol for transmission and receipt of data over the network, the protocol configured to cause the node to perform a plurality of acts when transmitting or receiving data, the acts comprising:
    transmitting a request for control of a network bus to a network hub, the request transmitted at a first data rate;
    receiving confirmation from the network bus that the node has control of the network bus; and responsive to receiving the confirmation, transmitting data over the network bus at a second data rate, the second data rate being higher than the first data rate, wherein the node comprises a pin, the pin of the node is tied to ground to indicate that a second node in the network system is prohibited from receiving the data.

19. The node of claim 18, the acts further comprising:

prior to receiving the confirmation from the network hub, refraining from transmitting data over the network bus.

* * * * *